(12) United States Patent
Ogata

(10) Patent No.: US 8,229,116 B2
(45) Date of Patent: Jul. 24, 2012

(54) INFORMATION PROCESSING APPARATUS AND METHOD AND PROGRAM

(75) Inventor: Ichiro Ogata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1046 days.

(21) Appl. No.: 11/751,878

(22) Filed: May 22, 2007

(65) Prior Publication Data

US 2007/0274520 A1 Nov. 29, 2007

(30) Foreign Application Priority Data

May 26, 2006 (JP) ................................ 2006-146839

(51) Int. Cl.
*H04L 29/06* (2006.01)
(52) U.S. Cl. ......... 380/201; 380/255; 380/259; 380/260
(58) Field of Classification Search .................. 380/201, 380/255, 259, 260
See application file for complete search history.

(56) References Cited

U.S. PATENT DOCUMENTS

| | | | | |
|---|---|---|---|---|
| 6,912,655 B1* | 6/2005 | Zucker | | 713/163 |
| 6,986,044 B1* | 1/2006 | Inada | | 713/170 |
| 7,418,599 B2* | 8/2008 | Peters | | 713/193 |
| 7,434,047 B2* | 10/2008 | Sharma | | 713/163 |
| 2002/0002413 A1* | 1/2002 | Tokue | | 700/94 |
| 2004/0177257 A1* | 9/2004 | Fujinawa et al. | | 713/189 |
| 2005/0039034 A1* | 2/2005 | Doyle et al. | | 713/193 |
| 2005/0187966 A1* | 8/2005 | Iino | | 707/102 |
| 2006/0109982 A1* | 5/2006 | Puiatti et al. | | 380/200 |
| 2006/0149965 A1* | 7/2006 | Sharma | | 713/163 |
| 2007/0033419 A1* | 2/2007 | Kocher et al. | | 713/193 |
| 2008/0137848 A1* | 6/2008 | Kocher et al. | | 380/201 |

FOREIGN PATENT DOCUMENTS

| | | |
|---|---|---|
| JP | 07-245605 | 9/1995 |
| JP | 3141942 | 12/2000 |
| JP | 2001-93227 | 4/2001 |
| JP | 2003-318880 | 11/2003 |
| JP | 2005-260448 | 9/2005 |
| JP | 2006-023941 | 1/2006 |
| WO | WO 2005008385 A2 * | 1/2005 |

* cited by examiner

*Primary Examiner* — Edan Orgad
*Assistant Examiner* — Bradley Holder
(74) *Attorney, Agent, or Firm* — Oblon, Spivak, McClelland, Maier & Neustadt, L.L.P.

(57) ABSTRACT

An information processing apparatus configured to transfer encrypted information from a sending source to a sending destination, includes: a decryptor, an encryptor, and a transmitter. The decryptor is configured to decrypt the encrypted content supplied from the sending source by use of a common key used in the sending source. The encryptor is configured to encrypt the information decrypted by the decryptor by use of a common key used in the sending destination and output the encrypted information as information to be transferred to the sending destination. The transmitter is configured to transmit the information decrypted by the decryptor to the encryptor through a route in the information processing apparatus.

14 Claims, 20 Drawing Sheets

FIG.5

| DEVICE DATABASE ||||||
| DEVICE ID | DEVICE CATEGORY | SECURITY GROUP | D key | N key | LE key |
| --- | --- | --- | --- | --- | --- |
| 101 | CAMCODER | GROUP A | ✓ | − | ✓ |
| 211 | MONITOR | GROUP A | − | − | ✓ |
| 321 | EDITOR | GROUP A | − | ✓ | ✓ |
| 441 | DECK | GROUP A | ✓ | ✓ | ✓ |
| 450 | DECK | OUT OF GROUP | | | |

FIG.6

| KEY DATABASE ||||
| SECURITY GROUP | D key VALUE | N key VALUE | LE key VALUE |
| --- | --- | --- | --- |
| GROUP A | a4-3f-dd-9e-d7-0b-f3-91 | fe-f0-9a-90-b4-cb-66-e8 | e8-ac-c7-3c-df-93-49-34 |

FIG.9

|  | CONTENTS OF ENCRYPTED CHANNEL FOR WHICH KEY IS USED | ENCRYPTED CHANNEL i |
|---|---|---|
| D key | DISC MEDIA | 1 |
| N key | NETWORK INTERFACE | 2 |
| LE key | HD-SDI INTERFACE | 3 |

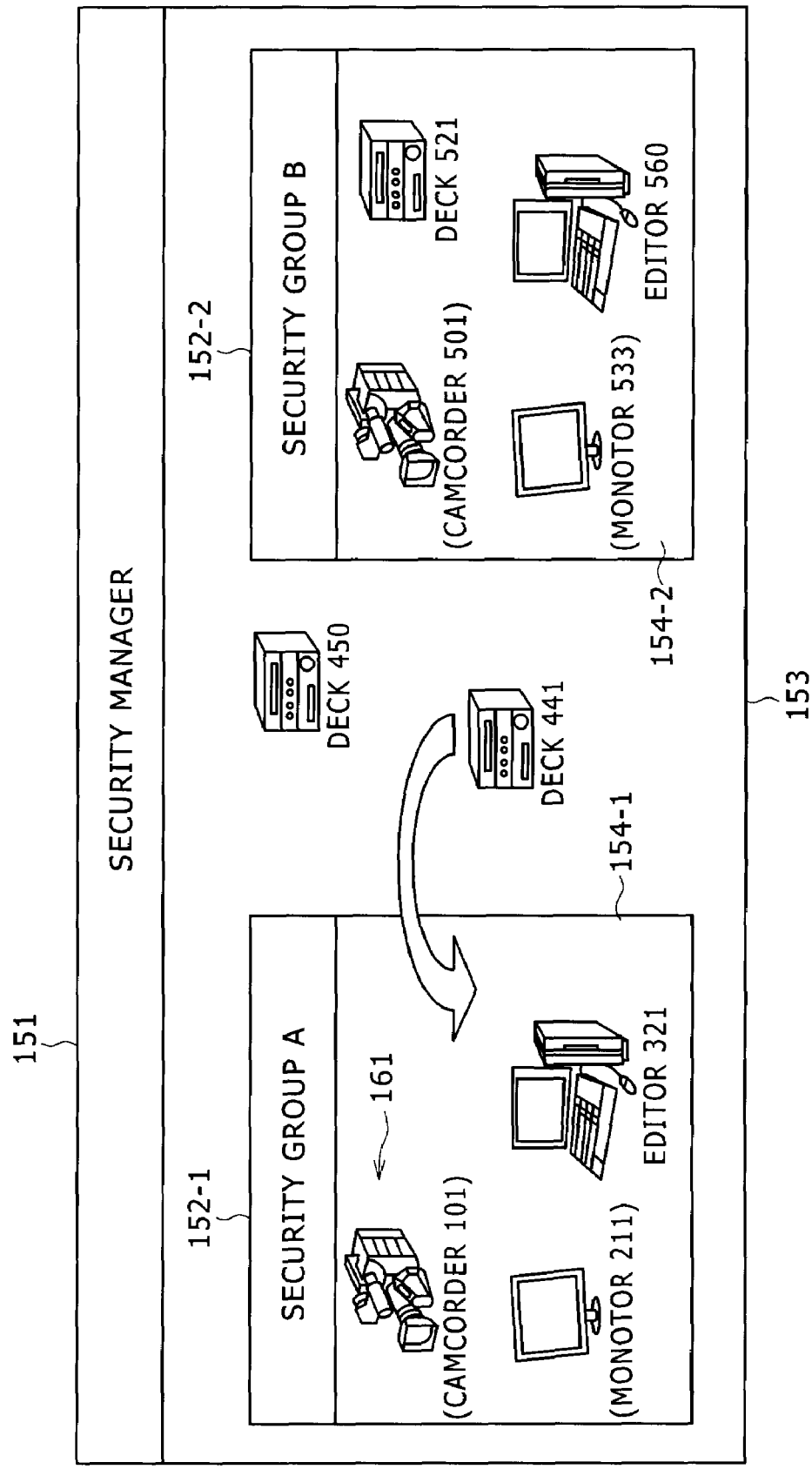

FIG.14

| DEVICE DATABASE | | | | | |
|---|---|---|---|---|---|
| DEVICE ID | DEVICE CATEGORY | SECURITY GROUP | D key | N key | LE key |
| 101 | CAMCODER | GROUP A | ✓ | − | ✓ |
| 211 | MONITOR | GROUP A | − | − | ✓ |
| 321 | EDITOR | GROUP A | − | ✓ | ✓ |
| 441 | DECK | GROUP A | ✓ | ✓ | ✓ |
| 450 | DECK | OUT OF GROUP | | | |
| 501 | CAMCODER | GROUP B | ✓ | − | ✓ |
| 533 | MONITOR | GROUP B | − | − | ✓ |
| 560 | EDITOR | GROUP B | − | ✓ | ✓ |
| 521 | DECK | GROUP B | ✓ | ✓ | ✓ |

FIG.15

| KEY DATABASE | | | |
|---|---|---|---|
| SECURITY GROUP | D key VALUE | N key VALUE | LE key VALUE |
| GROUP A | a4-3f-dd-9e-d7-0b-f3-91 | fe-f0-9a-90-b4-cb-66-e8 | e8-ac-c7-3c-df-93-49-34 |
| GROUP B | 99-29-6d-8b-9c-c1-46-1c | 71-3c-b8-7a-68-8b-d8-af | d9-e0-b8-e9-3b-26-b9-64 |

INFORMATION PROCESSING APPARATUS AND METHOD AND PROGRAM

CROSS REFERENCES TO RELATED APPLICATIONS

The present invention contains subject matter related to Japanese Patent Application JP 2006-146839 filed with the Japan Patent Office on May 26, 2006, the entire contents of which being incorporated herein by reference.

BACKGROUND OF THE INVENTION

1. Field of the Invention

The present invention relates to an information processing apparatus and method and a program and, more particularly, to an information processing apparatus and method and a program configured to realize the proper protection of protection information in an environment where protection information is transmitted and received between two or more devices.

2. Description of the Related Art

Recently, protection technologies for the information (hereafter referred to as protection information) for protecting copyrights and so on have been attracting attention, including content protection technologies.

For example, Japanese Patent Laid-open No. 2001-93227 (hereinafter referred to as Patent Document 1) discloses a protection technology configured to not only view content but also edit content with the copyright thereof protected.

Japanese Patent No. 3141942 (hereinafter referred to as Patent Document 2) discloses a protection technology configured to determine content transmission by executing cross authentication between devices on a one by one basis, encrypt content, and transmit the encrypted content.

In addition, various protection technologies, such as CPRM (Content Protection for Recordable Media), CSS (Content Scrambling System), DTCP (Digital Transmission Content Protection), HDCP (High-bandwidth Digital Content Protection), and OpenMG, ARIB copy control bit, for example, as content protection technologies (or content encryption algorithms) intended for the copyright protection of finished content (for example, DVDs (Digital Versatile Discs) and airwaves).

SUMMARY OF THE INVENTION

However, it would be improper for related-art content protection technologies including those disclosed in the above-mentioned Patent Documents 1 and 2 to be directly applied to any environments in which protection information such as mentioned above is transmitted and received between two or more devices, to be more particular, production work flows of a broadcast station or a production company, for example.

For example, the protection technology disclosed in Patent Document 1 above is applied only to the completed data having SCDF (Super Content Distribution Format), so that this technology may not be directly applied to environments such as content protection, for example.

The protection technology disclosed in Patent Document 2 above demands the authentication that uses a bidirectional path every time reproduction or recording is executed, for example. On the other hand, because devices for use in environments, such as content production, are demanded to have a good operator response, these devices may sometimes be connected only by a unidirectional interface during operation. Therefore, the technology disclosed in patent document 2 above is not also directly applicable to environments, such as content production, for example.

Also, because any of the above-mentioned related-art content protection technologies intended for the copyright protection of completed content are configured to prevent unauthorized duplication and are poor in the interconnectability between schemes, it is difficult for these related-art technologies to be applied to any environments, such as content protection, in which content is completed by use of two or more devices from image taking to editing.

Therefore, the present invention addresses the above-identified and other problems associated with related-art methods and apparatuses and solves the addressed problems by realizing the proper protection of protection information in an environment in which protection information is transmitted and received between two or more devices.

In carrying out the invention and according to one embodiment of the present invention, there is provided an information processing apparatus configured to transfer encrypted information from a sending source to a sending destination. This information processing apparatus includes a decryptor, an encryptor, and a transmitter. The decryptor is configured to decrypt the encrypted content supplied from the sending source by use of a common key used in the sending source. The encryptor is configured to encrypt the information decrypted by the decryptor by use of a common key used in the sending destination and output the encrypted information as information to be transferred to the sending destination. The transmitter is configured to transmit the information decrypted by the decryptor to the encryptor through a route in the information processing apparatus.

In the above-mentioned information processing apparatus, there are a plurality of the decryptors and a plurality of the encryptors and the transmitter is configured by a cross-point switch that enters each of outputs of the plurality of decryptors into preset one of the plurality of encryptors.

In the above-mentioned information processing, the sending source and the sending destination are configured as security groups each containing a plurality of devices each set by use of a common key. Each of the security groups specifying that, when protection information is transmitted from a predetermined one of the plurality of devices to another, the predetermined one device encrypts the protection information by use of a common key to send resultant encrypted protection information, and the another device receives the encrypted protection information to decrypt the encrypted protection information by use of the common key. Different common keys are set as the common key. The decryptor decrypts first encrypted protection information sent from the sending source by use of the common key set in the sending source and outputs resultant protection information. The transmitter transmits the decrypted protection information outputted from the decryptor to the encryptor. The encryptor encrypts the decrypted protection information transmitted by the transmitter by use of the common key set in the sending destination and outputs resultant second encrypted protection information as information to be transferred to the sending destination.

In the above-mentioned information processing apparatus, in the security group that may become one of the sending source and the sending destination, there are a plurality of transmission forms in which the encrypted protection information is transmitted and different common keys are set to the plurality of transmission forms. A sequence including the decryptor, the transmitter, and the encryptor is arranged for each of the plurality of transmission forms. In each of the sequences, the decryptor executes decryption by use of the common key of the transmission form corresponding to the own sequence among the plurality of common keys set in the sending source and the encryptor executes encryption by use of the common key of the transmission form corresponding to the own sequence among the plurality of common keys set in the sending destination.

In carrying out the invention and according to another embodiment of the present invention, there is provided an information processing method for an information processing apparatus configured to transfer encrypted information from a sending source to a sending destination. This information processing method includes the steps of: inputting, decrypting, encrypting, outputting, transmitting, and executing. The inputting step inputs encrypted information supplied from the sending source. The decrypting step decrypts the encrypted information supplied from the sending source by use of a common key used in the sending source. The encrypting step encrypts the information decrypted the decryption step by use of a common key used in the sending destination. The outputting step outputs the encrypted information as information to be transferred to the sending destination. The transmitting step transmits the information decrypted in the decryption step to the encryptor through a route in the information processing apparatus. The executing step executes control so as to execute the steps while transmitting the information through a route in the information processing apparatus.

In carrying out the invention and according to still another embodiment of the present invention, there is provided a computer program that corresponds to the above-mentioned information processing method according to one embodiment of the invention.

In the information processing apparatus and method and the program of one embodiment of the invention, encrypted information is transferred from a sending source to a sending destination as follows. Namely, the information from the sending source is inputted in an encrypted status. The encrypted information is decrypted with a common key used in the sending source. The decrypted information is encrypted with a common key used in the sending destination. Then, the encrypted information is outputted to the sending destination. This sequence of processing is executed while transmitting this information through a route in the information processing apparatus itself or a transfer apparatus under the control of a program.

As described above and according to one embodiment of the invention, content can be protected. In addition, a proper content protection can be realized in an environment in which protection information is transmitted and received between two or more devices.

BRIEF DESCRIPTION OF THE DRAWINGS

FIG. 5 is a diagram illustrating an exemplary a device database held in the security manager shown in FIG. 3;

FIG. 6 is a diagram illustrating an exemplary key database held in the security manager shown in FIG. 3;

FIG. 9 is a diagram illustrating an exemplary correspondence between encrypted channel and encryption key;

FIG. 13 is a diagram illustrating exemplary GUI images of the security manager shown in FIG. 12;

FIG. 14 is a diagram illustrating an exemplary device database held in the security manager shown in FIG. 12;

FIG. 15 is a diagram illustrating an exemplary key database held in the security manager shown in FIG. 12;

DETAILED DESCRIPTION OF THE PREFERRED EMBODIMENTS

This invention will be described in further detail by way of example with reference to the accompanying drawings. The invention described herein and the embodiments thereof have the following correlation. The description hereof is intended to make sure of the fact that the embodiments supporting the invention described herein are described herein. Therefore, if there is any embodiment that, although described in the description of the preferred embodiment, is not described herein as corresponding to the invention, this does not denote in any manner that such an embodiment does not corresponding to the present invention. Conversely, if any embodiment is described herein as corresponding to the invention, it does not denote in any manner that such an embodiment does not corresponding to other inventions than the present invention.

Further, the description hereof does not denote the entire invention described herein. In other words, the existence of any invention described herein and not claimed herein will not deny the existence of any inventions that may be filed as a divisional application, emerge as a result of amendment, or added hereto in the future.

Figure 18:
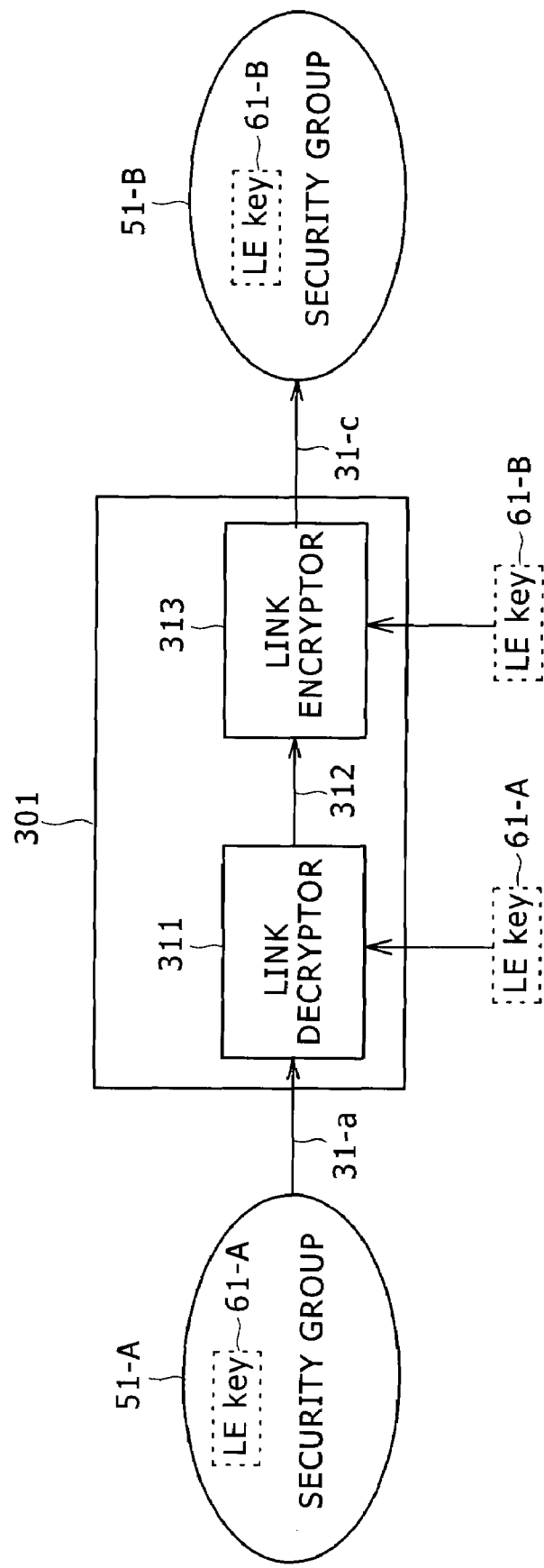
FIG. 18 is a schematic diagram illustrating another exemplary technique for content protection capable of solving problems involved in the configurations shown in FIGS. 16 and 17 in the content transmission based on the HD-SDI between two security groups shown in FIG. 12, including an exemplary configuration of a router to which an embodiment of the invention is applied.

An information processing apparatus according to one embodiment of the invention (for example, a router 301 shown in FIG. 18, a router 321 shown in FIG. 19, or a routing switch 351 shown in FIG. 20) transfers encrypted information from a sending source (a security group 51-A shown FIG. 18 for example) to a sending destination (a security group 51-B shown in FIG. 18 for example). This information processing apparatus includes a decryptor (for example, a link decryptor 311 shown in FIG. 18) configured to decrypt the encrypted content sent from the sending source by use of a common key (for example, a LE key 61-A shown in FIG. 18) used in the sending source. This information processing apparatus further includes an encryptor (for example, a link encryptor 313 shown in FIG. 18) configured to encrypt the information decrypted by the decryptor by use of a common key (for example, a LE key 61-B shown in FIG. 18) used in the sending destination and output the encrypted information as information to be transferred to the sending destination. This information processing apparatus still further includes a transmitter (for example, a transmission block 312 shown in FIG. 18) configured to transmit the information decrypted by the decryptor to the encryptor through a route in the information processing apparatus.

Figure 20:
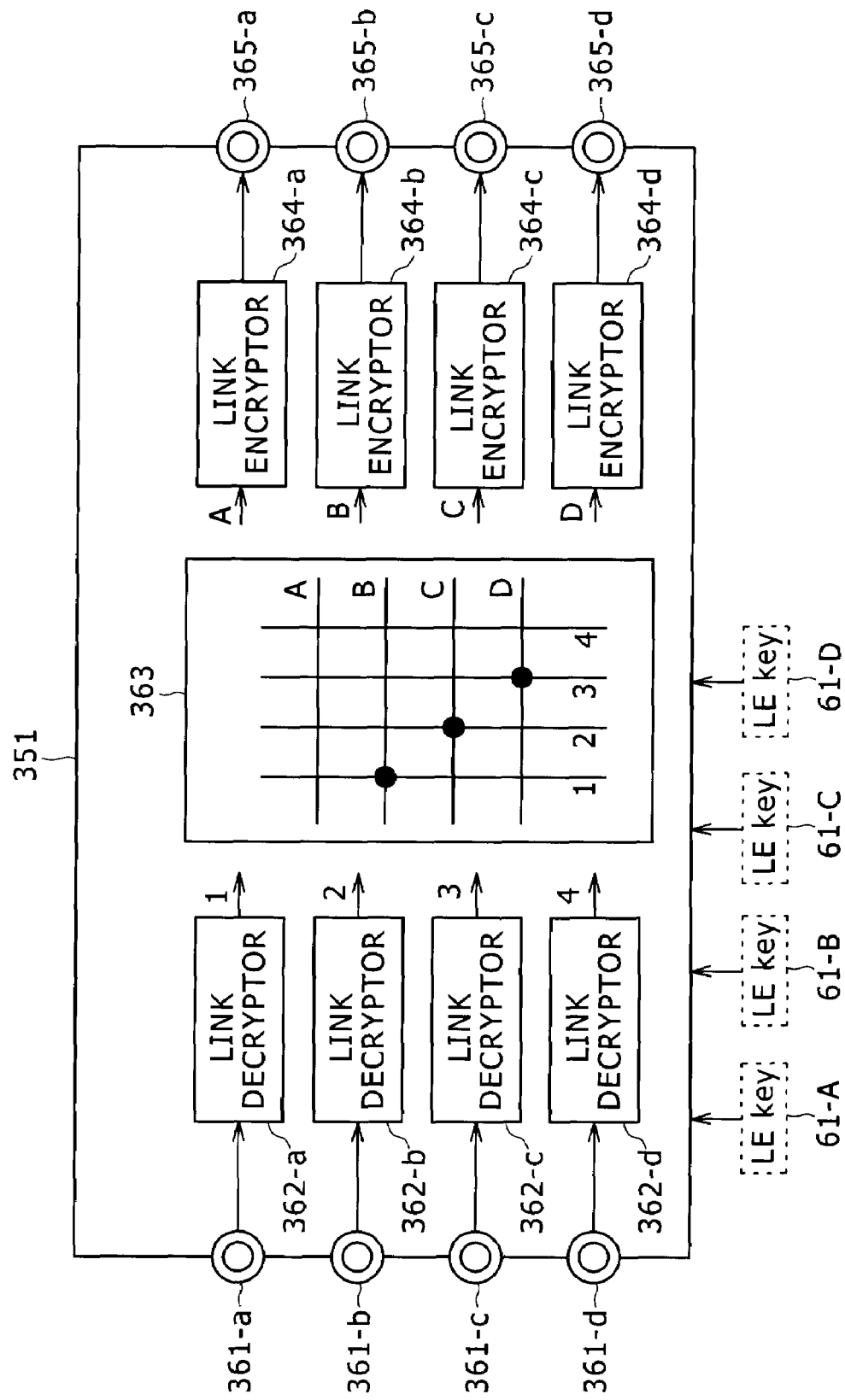
FIG. 20 is a block diagram illustrating an exemplary configuration of a routing switch to which an embodiment of the invention is applied.

In the above-mentioned information processing apparatus (in this paragraph, only a routing switcher 351 shown in FIG. 20 is referenced for with respect to correlation for the brevity of description), there are a plurality of the decryptors and a plurality of the encryptors (for example, link decryptor 362-*a* through link decryptor 362-*d* and link encryptor 364-*a* through link encryptor 364-*d* shown in FIG. 20). The transmitter is configured by a cross-point switch (for example, a cross-point switch 363 shown in FIG. 20) that enters each of outputs of the plurality of decryptors into preset one of the plurality of encryptors.

Figure 1:
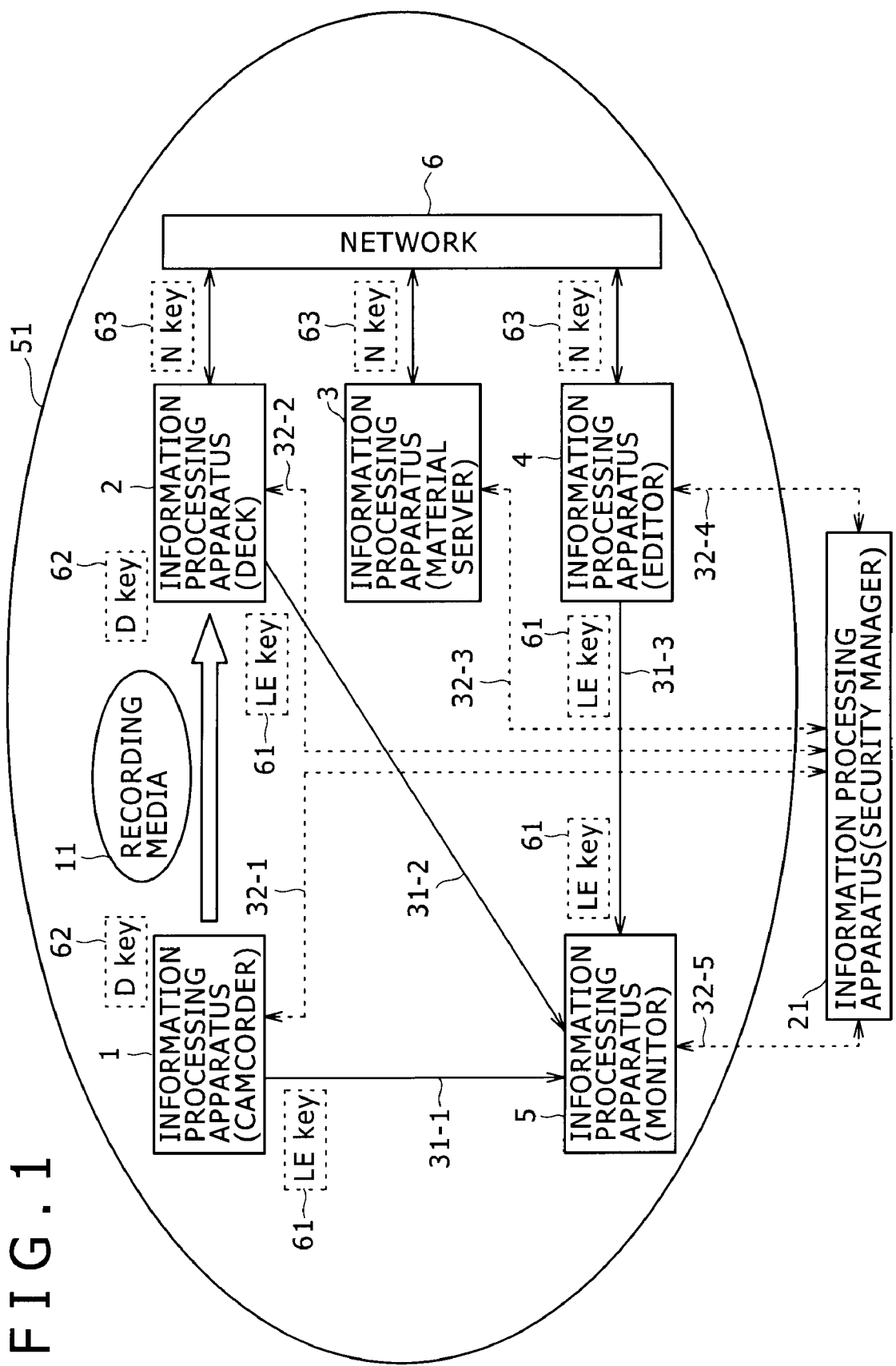
FIG. 1 is a block diagram illustrating an exemplary configuration of an information processing system to which an embodiment of the invention is applied.

In the above-mentioned information processing, the sending source and the sending destination are configured as security groups (for example, a security group 51 shown in FIG. 1) each containing a plurality of devices (for example, camcorder 1, a deck 2, a material server 3, an editor 4, and a monitor 5 shown in FIG. 1) each set by use of a common key (for example, a LE key 61 shown in FIG. 1). Each of the security groups specifying that, when protection information is transmitted from a predetermined one of the plurality of devices to another, the predetermined one device encrypts the protection information by use of a common key to send resultant encrypted protection information and the another device receives the encrypted protection information to decrypt the encrypted protection information by use of the common key. Different common keys are set as the common key. The decryptor decrypts first encrypted protection information sent from the sending source by use of the common key set in the sending source and outputs resultant protection information. The transmitter transmits the decrypted protection information outputted from the decryptor to the encryptor, and the encryptor encrypts the decrypted protection information transmitted by the transmitter by use of the common key set in the sending destination and outputs resultant second encrypted protection information as information to be transferred to the sending destination.

Figure 19:
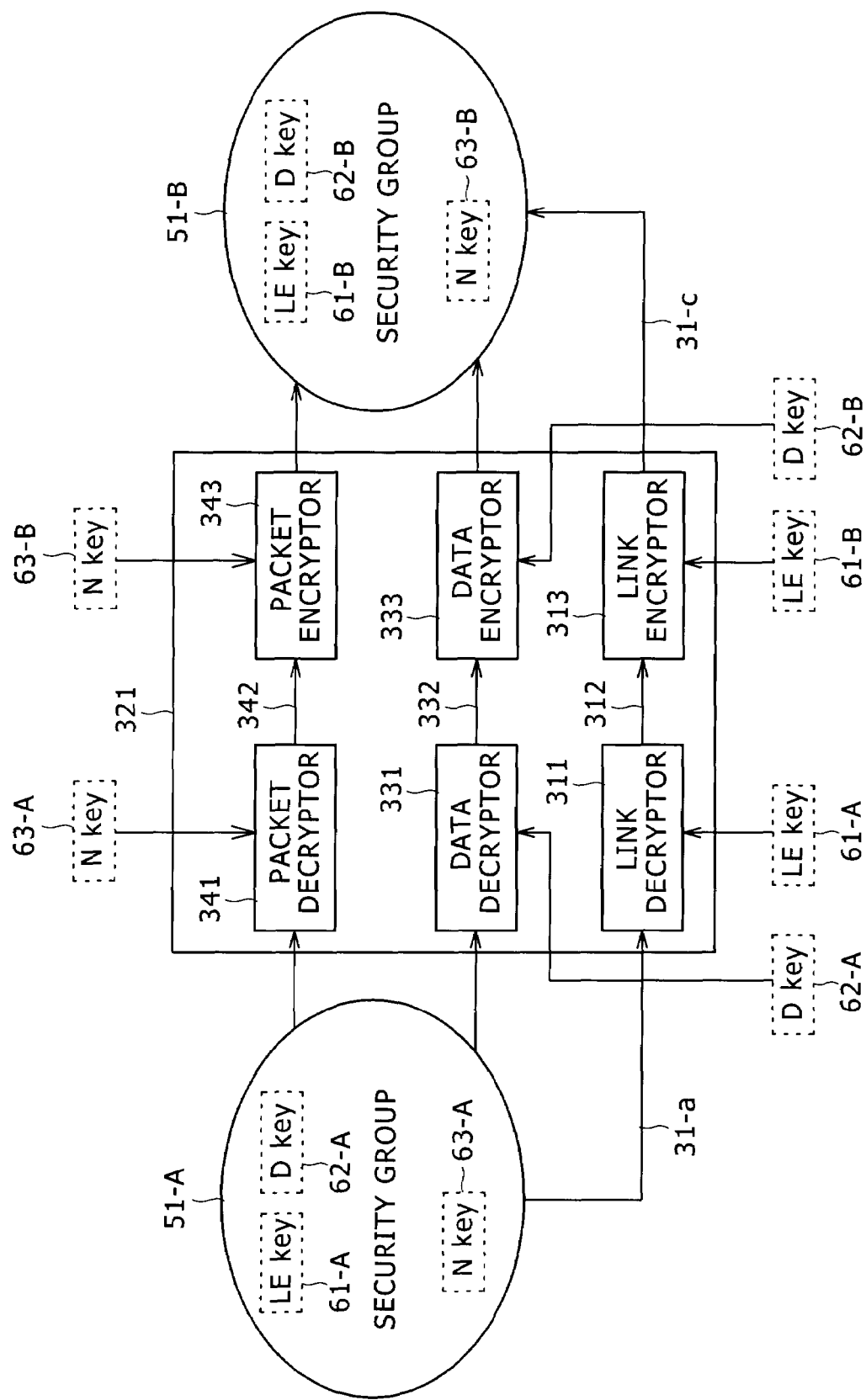
FIG. 19 is a block diagram illustrating another exemplary configuration of the router to which an embodiment of the invention is applied.

In the above-mentioned information processing apparatus (in this paragraph, only a router 321 shown in FIG. 19 is referenced for with respect to correlation for the brevity of description), in the security group that may become one of the sending source and the sending destination, there are a plurality of transmission forms. (For example, a transmission form based on HD-SDI signal lines 31-1 through 31-1, namely, a first type of HD-SDI interface shown in FIG. 9; a transmission form based on a recording media 11 shown in FIG. 1, namely, a second type of disc media shown in FIG. 9; and a transmission form based on a network 6 shown in FIG. 1, namely, a third type of network interface shown in FIG. 9). A plurality of these transmission forms in which the encrypted protection information is transmitted and different common keys (for example, a LE key 61 for the first type, a D key 62 for the second type, and the N key 63 for the third type as shown in FIGS. 1 and 9) are set to the plurality of transmission forms. A sequence including the decryptor, the transmitter, and the encryptor is arranged for each of the plurality of transmission forms. (For example, in the example shown in FIG. 19, a first sequence made up of a link decryptor 311, a transmission block 312, and a link encryptor 313; a second sequence made up of a data decryptor 331, a transmission block 332, and data encryptor 333; and a third sequence made up of a packet decryptor 341, a transmission block 342, and a packet encryptor 343). In each of the sequences, the decryptor executes decryption by use of the common key (for example, in the example of FIG. 19, the LE key 61-A for the first sequence, the D key 62-A for the second sequence, and the N key 63-A for the third sequence) of the transmission form corresponding to the own sequence among the plurality of common keys set in the sending source. The encryptor executes encryption by use of the common key (for example, in the example shown in FIG. 19, the LE key 61-B for the first sequence, the D key 62-B for the second sequence, and the N key 63-B for the third sequence) of the transmission form corresponding to the own sequence among the plurality of common keys set in the sending destination.

An information processing method and programs according to one embodiment of the invention are the method and the programs that correspond to the above-mentioned information processing apparatus practiced as one embodiment of the invention. The first program is executed by a computer shown in FIG. 22 to be described later, for example.

Now, referring to FIG. 1, there is shown an exemplary configuration of the information processing apparatus practiced as one embodiment of the invention.

It should be noted that, in FIG. 1, each box enclosed by solid lines is indicative of a block representative of an apparatus or a component thereof and each box enclosed by dashed lines is indicative of predetermined information. The use of these boxes is also applied to the subsequent drawings.

In the example shown in FIG. 1, the information processing system is made up of information processing apparatuses 1 through 5 between which protection information is transmitted and received and an information processing 21 configured to manage these information processing apparatuses 1 through 5.

It should be noted that the number of apparatuses between which protection information is transmitted and received is 5 in the example shown in FIG. 1; however, any number of apparatuses, if two or more, may configure the above-mentioned information processing system.

The protection information to be transferred between these information processing apparatuses may take any form; in the embodiments of the present invention, the form of the protection information denotes content containing video, to be more precise, a form in which this content is converted into an electrical signal or a form in which the content is fixed to a recording media as a signal. However, in what follows, for the brevity of description, the form in which content is converted into an electrical signal and the form in which content is fixed to a recording media as a signal are both referred to simply as content.

The protection of content to be transmitted and received between two or more apparatuses described above may form an environment made up of these apparatuses as follows. To be more specific, when each of two or more apparatuses is set with a common key and predetermined one of these apparatuses transmits content to another apparatus, this transmitting apparatus encrypts content with the common key and transmits the encrypted content to the receiving apparatus, which then decrypts the received encrypted content with the common key. This environment may be referred to as a peer group as a general term; in what follows, this environment is referred to as a security group.

In this case, in each security group, the content stored outside two or more apparatuses is always encrypted with a common key that is valid only in that security group. This configuration can solidly prevent, on the basis of encryption technologies, the risk of the connection between the two or more apparatuses in a security group and an apparatus outside that security group. Namely, this configuration can prevent content leakage from each security group.

In the example shown in FIG. 1, a security group 51 containing five information processing apparatuses 1 through 5 is formed.

In this case, if content is transmitted from one of the five information processing apparatuses 1 through 5 to another thereof, the content is encrypted with an encryption key with a same value set to each of these five apparatuses, namely, in the example shown in FIG. 1, any one of encryption keys LE key 61, a D key 62, and an N key 63 that will be described later. Then encrypted content is then transmitted to a desired target information processing apparatus. Consequently, the unintended leakage of content outside the security group 51 can be prevented.

If there are two or more content transmission forms within the security group 51, it is practicable to set different encryption keys to these transmission forms. In the example shown in FIG. 1, for the content transmission forms based on signals lines 31-1 through 31-3, the LE key 61 is set. For the content transmission form based on the recording to a recording media 11, the D key 62 is set. For the content transmission form based on a network 6, the N key 63 is set.

To be more specific, in transmitting content to the information processing apparatus 2, the information processing apparatus 1 encrypts the content with the D key 62 and records the encrypted content to the recording media 11. The recording media 11 recorded with this encrypted content is loaded onto the information processing apparatus 2 by a user for example. Then, the information processing apparatus 2 reads the encrypted content from the recording media 11 and decrypts the encrypted content by use of the D key 62.

On the other hand, in transmitting content to the information processing apparatus 5, the information processing apparatus 1 encrypts the content with the LE key 61 and sends the encrypted content to the information processing apparatus 5 via the signal line 31-1. Receiving the encrypted content, the information processing apparatus 5 decrypts the received encrypted content by use of the LE key 61. It should be noted that substantially the same processing is executed in transmitting content from the information processing apparatus 2 to the information processing apparatus 5 via the signal line 31-2 and from the information processing apparatus 4 to the information processing apparatus 5 via the signal line 31-3.

In transmitting content from predetermined one of the information processing apparatuses 2 through 4 to another thereof, the predetermined apparatus encrypts content with the N key 63 and sends the encrypted content to another apparatus via the network 6. Then, the receiving apparatus receives the encrypted content and decrypts the received content with the N key 63.

It should be note that, although the environment to be formed as the security group 51 is not especially restricted; however, in the present embodiment of the invention, one content production environment, or one work flow of a broadcast station or a production company is assumed. Therefore, in the example shown in FIG. 1, as indicated as enclosed by parentheses, the information processing apparatus 1 is made up of a so-called camcorder (an imaging apparatus), the information processing apparatus 2 is made up of so-called deck (a recording/reproducing apparatus), and the information processing apparatus 3 is made up of a so-called material server (or content storage apparatus). The information processing apparatus 4 is made up of a so-called editor (a non linear editing apparatus) and the information processing apparatus 5 is made up of a so-called monitor (a display apparatus). So, in what follows, the information processing apparatus 1 is referred to as a camcorder 1, the information processing apparatus 2 as a deck 2, the information processing apparatus 3 as a material server 3, the information processing apparatus 4 as an editor 4, and the information processing apparatus as 4 an monitor 5. Namely, in the example shown in FIG. 1, devices, the camcorder 1 through the monitor 5 as the content production devices for use in a content production environment join one security group 51.

Since the security group 51 is formed by such a work flow as described above, it is assumed in the example shown in FIG. 1 that the form of transmission of content along the signal lines 31-1 through 31-3, namely, the transmission interface use HD-SDI (Bit-Serial Digital Interface for High-Definition Television System) specified in SMPTE (Society of Motion Picture and Television Engineers) 292M. However, such a transmission interface is not restricted to the example in the embodiment of the invention; for example, any other interfaces, such as SDI (Serial Digital Interface) and SDTI-CP (Serial Data Transport Interface Content Package Format), may be available as far as baseband signals or compressed signals of digital image and audio data can be transmitted.

In the present embodiment, the recording media 11 is assumed to be an optical disc, for example; it is also practicable to use any other recording media as far as image and audio data can be recorded, such as magnetic tapes, hard disc drives, and memory cards.

In the present embodiment, the network 6 is assumed to be Ethernet (registered trademark) for example; it is also practicable to use any other networks, such as IEEE1394 (The Institute of Electrical and Electronics Engineers, Inc.) and FiberChannel (registered trademark), as far as the compressed or baseband digital image and audio data can be transmitted.

It should be noted that, in the example shown in FIG. 1, the devices belonging to the work flow formed as the security group 51 are only the five devices, the camcorder 1 through the monitor 5 as described above. However, some work flows of broadcast stations and production companies may generally manage more devices. In such a case, the key setting and key management may be manually executed for the common keys, such as the LE key 61, the D key 62, and the N key 63 in the example shown in FIG. 1, for the content transmission forms used. This, however, may cause problems of key setting errors and unintended key leakage, for example. In addition, if the number of devices within each work flow increases and the addition (hereafter also referred to as joining) and deletion (hereafter also referred to as disjoining) of devices to and from each work flow occur frequently, the labor for setting work increases. Therefore, it is demanded to not only form each security group with all devices within each work flow provided with an encryption capability but also solve, at the same time, the above-mentioned problems expected to take place in operation.

In order to solve the above-mentioned problems, an information processing apparatus 21 configured to manage the security group 51 is arranged for the information processing system shown in FIG. 1. It should be noted that the information processing apparatus 21 is hereafter referred to as a security manager 21 as indicated in the corresponding parentheses in FIG. 1. The security manager 21 has capabilities of managing the key setting and key management for the devices joining the security group 51, namely, the camcorder 1 to the monitor 5, and the capability of managing the security group 51 itself. Further details of the security manager 21 will be described later with reference to FIGS. 3 through 15.

Figure 2:
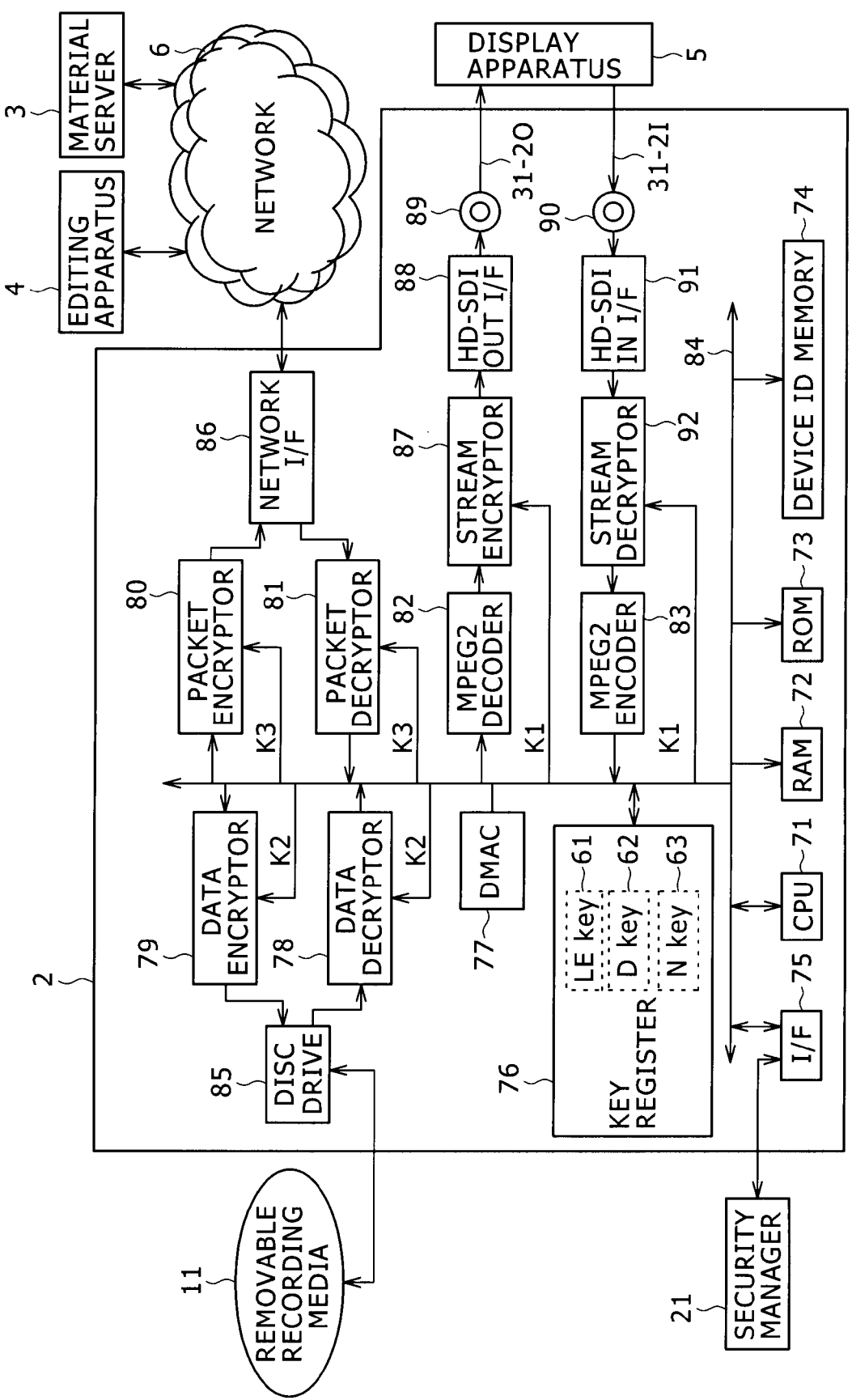
FIG. 2 is a block diagram illustrating an exemplary configuration of a deck that joins a security group based on the information processing system shown in FIG. 1.

Referring to FIG. 2, there is shown a block diagram illustrating an exemplary configuration of the deck 2 as one example of devices that can join the security group 51.

In FIG. 2, a CPU (Central Processing Unit) 71 executes various kinds of processing operations as instructed by programs stored in a ROM (Read Only Memory) 73 and so on. A RAM (Random Access Memory) 72 stores, from time to time, programs to be executed by the CPU 71 and data necessary for the execution. A device ID memory 74 stores a device ID that identifies the deck 2. The CPU 71, the RAM 72, the ROM 73, and the device ID memory 74 are interconnected by a bus 84.

The CPU 71 is also connected with devices, an I/F 75 to an MPEG2 encoder 83, via the bus 84.

The I/F 75 is connected with the security manager 21. The form of this I/F 75 is not especially restricted; for example, an interface for connecting a predetermined network, a serial interface, or a memory card may be used.

A key register 76, made up of a secure memory, a nonvolatile memory for example, stores the common keys, namely, the LE key 61, the D key 62, and the N key 63, to be set by the security manager 21 for the security group 51.

A DMAC (Direct Memory Access Controller) 77 copies information provided from a block connected to the bus 84 to the RAM 72 and provides the information copied to the RAM 72 to another block connected to the bus 84.

A data decryptor 78 decrypts data read from the recording media 11 by a disc drive 85, namely, encrypted content, by use of the D key 62 and provides the resultant decrypted content to the PAM 72 and so on under the control of the DMAC 77. On the other hand, a data encryptor 79 encrypts data written to the recording media 11, namely, content, by use of the D key 62 and provides the resultant encrypted content to the disc drive 85. It should be noted that the D key 62 is read from the key register 76 to be provided to the data decryptor 78 and the data encryptor 79 via a key supply route K2.

The disc drive 85 writes the encrypted content supplied from the data encryptor 79 to the recording media 11 and reads encrypted content from the recording media 11 to provide the encrypted content to the data decryptor 78.

In the present embodiment, data to be recorded to the recording media 11 is the data (hereafter referred to as MPEG data) compressed in accordance with the MPEG2 (Moving Picture Experts Group-2) standard. Namely, in the present embodiment, the RAM 72 stores content in the form of MPEG data.

In this case, the MPEG data stored in the RAM 72 is network-packetized by the CPU 71 as necessary and the resultant packets are supplied to a packet encryptor 80 by the DMAC 77. Then, the packet encryptor 80 encrypts the supplied packet with the N key 63 and supplies the encrypted packets to a network I/F 86.

It should be noted that the MPEG data outputted from the data decryptor 78 is once copied onto the RAM 72; however, if practicable, this MPEG data may be directly sent to the packet encryptor 80 after being network-packetized, without passing through the RAM 72.

On the other hand, when content is received by the network I/F 86 in the form of encrypted packets, then a packet decryptor 81 decrypts these encrypted packets with the N key 63 and outputs the resultant decrypted packets. The decrypted packets outputted from the packet decryptor 81 are converted by the CPU 71 into MPEG data to be provided to the RAM 72 and so on under the control of the DMAC 77.

It should be noted that the N key 63 is read from the key register 76 to be provided to the packet encryptor 80 and the packet decryptor 81 via the key supply route K3.

The network I/F 86 sends encrypted packets received from the packet encryptor 80 to the network 6 and provides encrypted packets received from the network 6 to the packet decryptor 81.

Also, the MPEG data recorded to the RAM 72 is supplied to an MPEG2 decoder 82, as necessary. Then, the MPEG2 decoder 82 decompresses the received data in accordance with the MPEG-2 standard and supplies the resultant baseband data to a stream encryptor 87. The stream encryptor 87 encrypts the received baseband data with the LE key 61 and supplies the resultant encrypted baseband data to an HD-SDI OUT I/F 88. The HD-SDI OUT I/F 88 outputs the received encrypted baseband data to a terminal 89 in the form of an HD-SDI signal.

It should be noted that the MPEG data outputted from the data decryptor 78 is once copied onto the RAM 72; however, if practicable, this MPEG data may be directly transferred to the MPEG2 decoder 82 after without passing through the RAM 72.

On the other hand, an HD-SDI IN I/F 91 receives the encrypted baseband data in the form of an HD-SDI signal at a terminal 90 and supplies the received signal to a stream decryptor 92. Then, the stream decryptor 92 decrypts the encrypted baseband data with the LE key 61 and supplies the decrypted data to the MPEG2 encoder 83. The MPEG2 encoder 83 compresses the received baseband data in accordance with the MPEG-2 standard and outputs the compressed MPEG data. This MPEG data is provided to the RAM 72 and so on by the DMAC 77.

It should be noted that the LE key 61 is read from the key register 76 to be supplied to the stream encryptor 87 and the stream decryptor 92 via a key supply route K1.

Thus, the configuration of the deck 2 has been described. It should be noted that those who skilled in the art may easily understand recording and reproducing operations of the deck 2 by referencing the above description from time to time, so that the description of content recording and reproducing operations will be skipped.

Operations by the deck 2 to be executed on the security manager 21 will be described later with reference to FIGS. 10 and 11.

Although the exemplary configurations of other devices that can join the security group 51 shown in FIG. 1 are not illustrated, it is assumed in the present embodiment that the devices, the camcorder 1 to the monitor 6 (except for the deck 2), be configured to have the following functions, for example. Namely, it is assumed that the camcorder 1 be configured to have at least substantially the same functions as the key register 76, the I/F 75, the data encryptor 79, and the stream encryptor 87 shown in FIG. 2, in addition to the functions provided by related-art camcorders. It is assumed that the material server 3 be configured to at least have substantially the same functions as the key register 76, the I/F 75, the packet encryptor 80, and the packet decryptor 81 shown in FIG. 2 in addition to the functions provided by related-art material servers. It is assumed that the editor 4 be configured to have at least substantially the same functions as the key register 76, the I/F 75, the packet encryptor 80, the packet decryptor 81, and the stream encryptor 87 shown in FIG. 2 in addition to the functions provided by related-art material editors. It is assumed that the monitor 5 be configured to at least have substantially the same functions as the key register 76, the I/F 75, and the stream decryptor 92 shown in FIG. 2 in addition to the functions provided by related-art monitors.

The security group 51 to which each of the above-mentioned devices having the above-mentioned functions is managed by the security manager 21 as described above. So, the following describes in detail this security manager 21 with reference to FIGS. 3 through 15.

Figure 3:
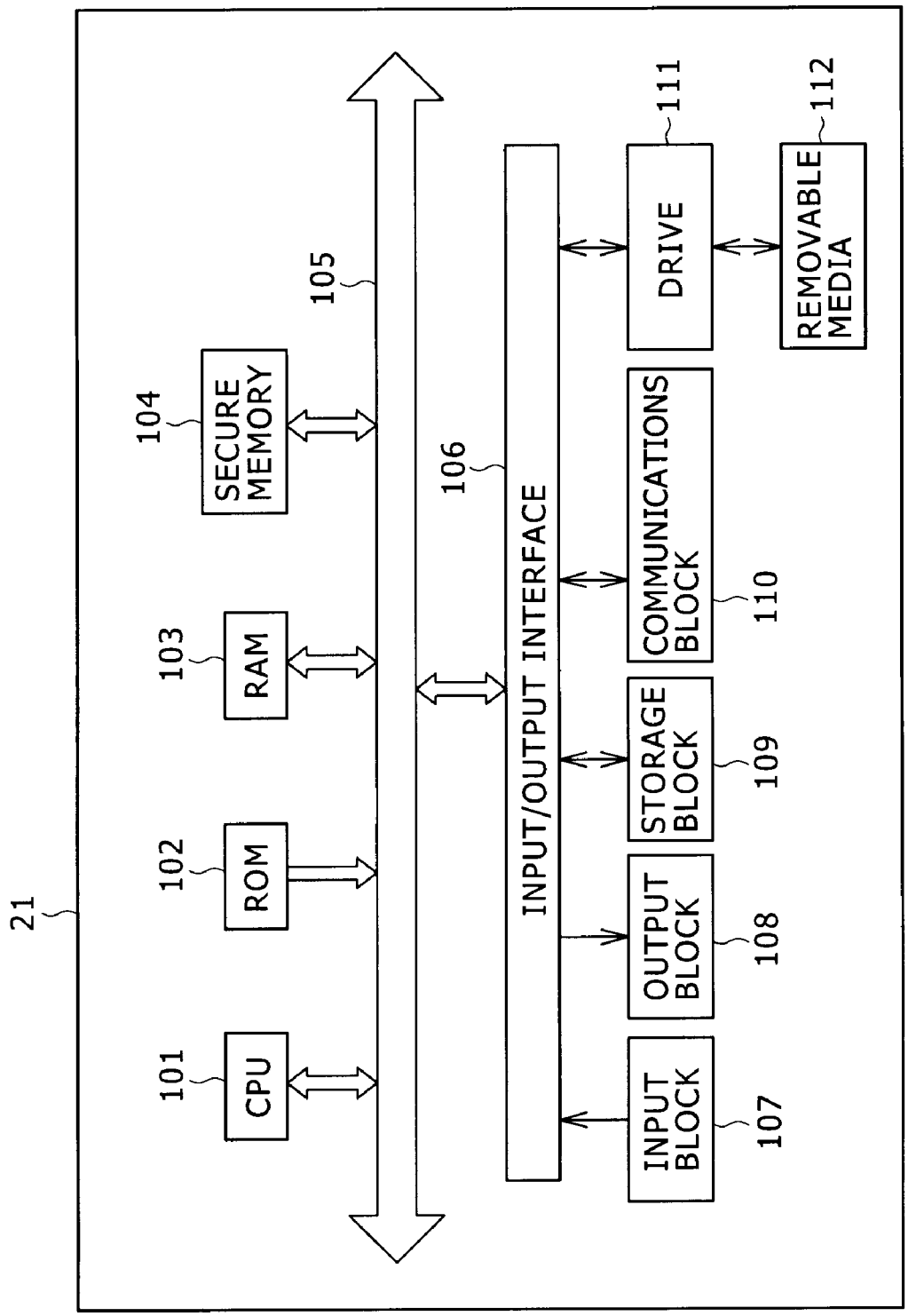
FIG. 3 is a block diagram illustrating an exemplary configuration of a security manager arranged in the information processing system shown in FIG. 1.

Referring to FIG. 3, there is shown a block diagram illustrating an example in which the security manager 21 is configured by a computer.

In FIG. 3, a CPU 101 executes various kinds of processing operations as instructed by programs stored in a ROM 102 or a storage block 109. A RAM 103 stores, from time to time, programs to be executed by the CPU 101 and data necessary for the execution. A secure memory 104 made up of a non-volatile memory, for example, stores, from time to time, a device database shown in FIG. 5 or 14 and a key database shown in FIGS. 6 and 15. These CPU 101, ROM 102, RAM 103, and secure memory 104 are interconnected by a bus 105.

As described above, in the example shown in FIG. 3, in order to provide the secrecy of the key database and so on to be described later, the secure memory 104 for dedicated use is arranged. However, a technique for providing this secrecy is not restricted to the example shown in FIG. 3; for example, it is practicable to use a technique for installing a secure OS (Operating System), such as Linux (registered trademark).

Figure 4:
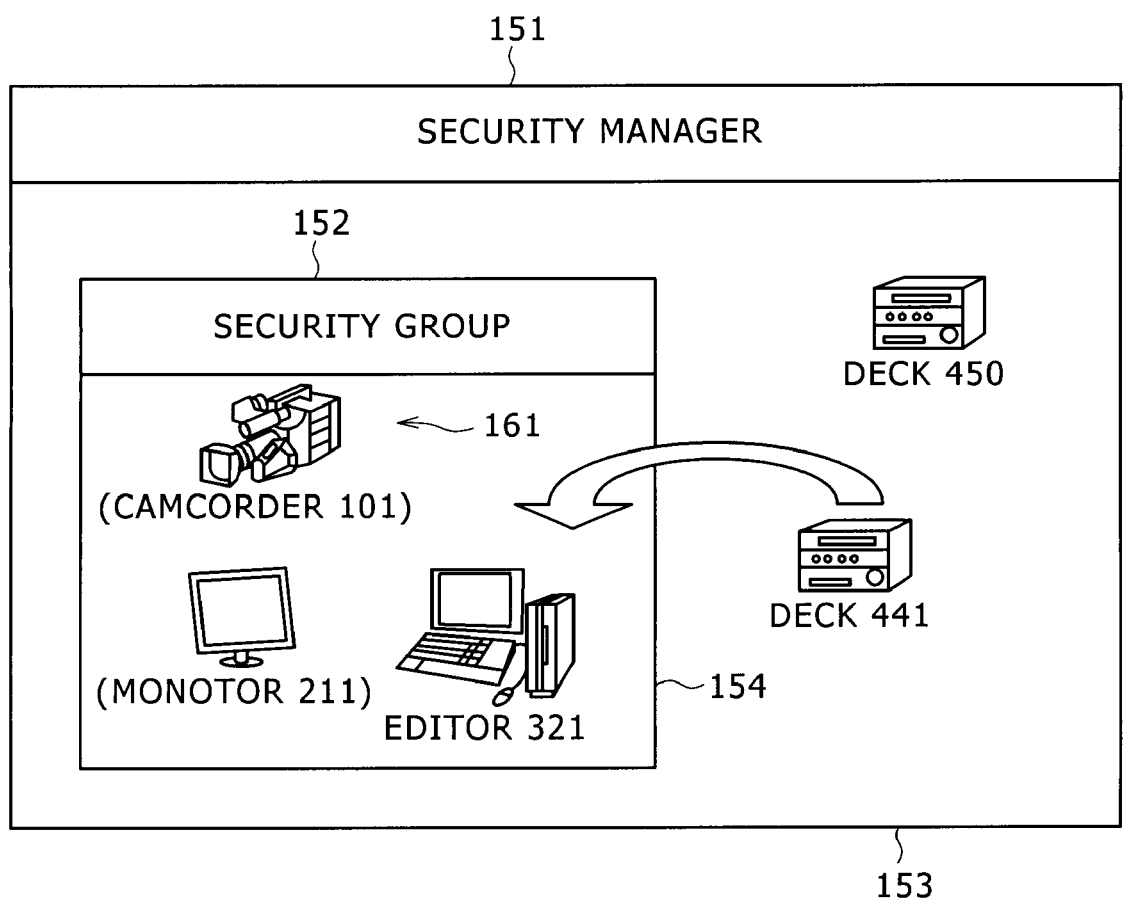
FIG. 4 is a diagram illustrating GUI images of the security manager shown in FIG. 3.

The CPU 101 is also connected with an input/output interface 106 via the bus 105. The input/output interface 106 is connected with an input block 107 made up of a keyboard, a mouse, and a microphone, for example, and an output block 108 made up of a display monitor and a loudspeaker, for example. The CPU 101 outputs results of executed processing to the output block 108. For example, image output operations as shown in FIGS. 4 and 13 are executed by the output block 108.

The storage block 109 connected to the input/output interface 106, made up of a hard disc drive, for example, stores programs to be executed by the CPU 101 and data necessary for the execution.

A communications block 110 communicates with external apparatuses via a network, such as the Internet or a LAN (Local Area Network). In the present embodiment, for example, the communications block 110 communicates each of the devices that can join the security group 51 shown in FIG. 1, namely, the devices, the camcorder 1 to monitor 5, for example. In this case, as described before with reference to the explanation of the I/F 75 shown in FIG. 2, communication is executed through a predetermined network connection interface, serial interface, or memory card, for example. Also, the communications block 110 can get programs from external apparatuses and store the obtained programs in the storage block 109 under the control of the CPU 101.

A drive 111 connected to the input/output interface 106 drives a removal media 112, such as a magnetic disc, an optical disc, a magneto-optical disc, or a semiconductor memory, for example, upon loading thereof on the drive 111, thereby getting programs and data therefrom. The obtained programs and data are transferred to the storage block 109 for storage.

The following describes an operation of the security manager 21 having the above-mentioned configuration, with reference to FIGS. 4 through 15.

When joining a new device to the security group 51 shown in FIG. 1 or disjoining a device therefrom, the manager, for example, of the security group 51 connects the device concerned to the security manager 21 and executes a GUI (Graphical User Interface) operation thereon. FIG. 4 shows an example of a GUI image that is displayed by the security manager 21 at this moment.

The GUI image shown in the example of FIG. 4 is configured by a window 151 called a "security manager". An area 153 in this window 151 shows a window 152 called a "security group". An area 154 of the window 152 shows an icon 161 of a device already joined to the security group 51. The icon 161 is formed by a picture of the device and a text indicative of the category and ID of the device. It should be noted that, in what follows, two or more icons 161 are distinguished from each other by use of a text. For example, the icon 161 indicated by the arrow of reference numeral 161 is referred to as the icon 161 of the "camcorder 101".

In the example shown in FIG. 4, the area 154 of the window 152 shows the icon 161 of the "camcorder 101", the icon 161 of the "monitor 211", and the icon 161 of the "editor 321". This allows the manager, for example, to understand the camcorder having device ID 101, the monitor having device ID 211, and the editor having device ID 321 are devices that have already been joined in the security group 51. Namely, in comparison with the example shown in FIG. 1, the status shown in FIG. 4 is that the camcorder having device ID 101 has already been joined as the camcorder 1, the monitor having device ID 211 has already been joined as the monitor 5, and the editor having device ID 321 has already been joined as the editor 4, while the deck 2 and the material server 3 have not yet been joined.

The parentheses enclosing the text portion of the icon 161 are indicative that the device indicated by the icon 161 is not connected with the security manager 21. Namely, in the example shown in FIG. 4, the text portions of the icon 161 of the "camcorder 101" and the icon 161 of the "monitor 211" are enclosed by parentheses, so that the camcorder having device ID 100 and the monitor having device ID 211, namely, the camcorder 1 and the monitor 5 shown in FIG. 1, are not connected with the security manager 21. In contrast, the text portion of the icon 161 of the "editor 321" is not enclosed by parentheses, so that the editing having device ID 321, namely, the editor 4 shown in FIG. 1, is connected with the security manager 21.

It should be noted that whether or not the text portion of the icon 161 is enclosed by parentheses, or whether or not the device indicated by the icon 161 is connected with the security manager 21 does not affect the encryption capability of the device. To be more specific, as will be described later, when a new device is connected to the security manager 21 for joining the security group 51, the security manager 21 executes key setting on this new device. Therefore, for any device joined to the security group 51, the encryption capability based on the key set by the security manager 21 keeps working after that device is disconnected from the security manager 21. This configuration allows those devices which it is difficult to operate as connected with the security manager 21, the camcorder 1 to be operated at the site of news gathering, for example, to be protected by content encryption. Obviously, if a device use environment permits, any device may be constantly connected to the security manager 21.

In the example shown in FIG. 4, the icon 161 of a "deck 450", the icon 161 of a "deck 441" are shown in the area 153 in addition to the window 152. In other words, the icon 161 of the "deck 450" and the icon 161 of the "deck 441" are not contained in the window 152. The icon 161 not contained in the window 152 is indicative of a device not currently joining the security group 51. The currently not joining device is indicative of not only a device that has not joined the security group 51 but also a device that has disjoined the security group 51. The displaying of the icon 161 in the area 153 is indicative that the device indicated by the icon 161 has been recognized by the security manager 21, namely, the device has been connected to the security manager 21 at least once.

If the manager, for example, wants to join the deck having device ID 441 to the security group 51 in this status, the manager may simply drag the icon 161 of the "deck 441" into the area 154 of the window 152 as indicated by the arrow shown in FIG. 4. Then, in response to the operation done by the manager, the security manager 21 rewrites the key register in the deck having device ID 441, namely, the contents of the key register 76 shown in FIG. 2, and, at the same time, rewrites, as shown in FIG. 5 for example, the device database stored in the secure memory 104 shown in FIG. 3 of the security manager 21. Consequently, the joining of the deck having device ID 441 to the security group 51 has been completed.

Namely, FIG. 5 shows one example of the device database managed by the security manager 21 and is indicative of an example corresponding to the status shown in FIG. 4.

In the device database shown in FIG. 5, a predetermine one line describes the information about predetermined one device managed by the security manager 21, namely, predetermined one device that has been connected to the security manager 21 at least once. The information about predetermined one device denotes the information written to each of items "device ID", "device category", "security group", "D key", "N key", and "LE key" in the example shown in FIG. 5.

Item "device ID" on predetermined one line describes the device ID of the device corresponding to that predetermined one line. The device ID is the information embedded beforehand in each device to be content-encrypted. For example, with the deck 2 shown in FIG. 2, the device ID is the information stored in the device ID memory 74. The device ID is not restricted to that mentioned above as far as protected against user writing; for example, a model name, a serial number, or a version number may be used as the device ID.

Item "device category" of predetermined one line describes the device category of the device corresponding to that predetermined one line. In the present embodiment, a material server not shown in FIG. 5 is used as a device category in addition to the camcorder, the monitor, the editor, and the deck shown in FIG. 5.

Item "security group" on predetermined one line describes the name of a group to which the device corresponding to that predetermined one line joins. Namely, in the example shown in FIG. 1, the number of security groups managed by the security manager 21 is one, namely, the security group 51; sometimes, however, two or more security groups may be arranged as will be described later. Therefore, this item "security group" is arranged so as to realize the managing of two or more security groups. However, because FIG. 5 is an example corresponding to the status shown in FIG. 4, only "group A" is shown in FIG. 5. Namely, "group A" represents the name of the security group 51 shown in FIG. 1. The device corresponding to the bottom line shown in FIG. 5, namely, the deck having device ID 450 joins no security group, so that the information indicative of "out of group" is written to item "security group".

Items "D key", "N key", and "LE key" on predetermined one line describe the setting contents of the D key 62, the N key 63, and the LE key 61 for the device corresponding to that predetermined one line. The setting contents include the key setting has been completed (indicated by check "V"), the key setting is not demanded (indicated by "-"), and the key setting has not been made (no entry). It should be noted that indicative that the key setting is not demanded is written to any device that has no capability of encrypting content by use of that key.

FIG. 6 shows an example of a key database associated with the D key 62, the N key 63, and the LE key 61 that are managed by the security manager 21. It should be noted that FIG. 6 show an example corresponding to the status shown in FIG. 4, namely, an example in which only one security group is arranged.

The security manager 21 generates the D key 62, the N key 63, and the LE key 61 (hereafter also referred to as key data) and registers the generated key data with the key database as shown in FIG. 6. In the example shown in FIG. 3, this key database is stored in the secure memory 104. In this process, so as to make difficult the breaking of the encryption of content, random values are normally used for the key data. Namely, the key data is generated by a random number generator (not shown), for example, incorporated in the security manager 21 and is safely stored with completeness and confidentiality.

It should be noted that, in the example shown in FIG. 6, the key length is 64 bits; however, it is practicable to select any other key length in accordance with a demanded encryption strength. For example, if AES (Advanced Encryption Standard) 128-bit is selected for the encryption algorithm to be used in the present system, the key length is 128 bits.

The security manager 21 can update the key data from time to time as necessary. In this case, the security manager 21 may record an update log to the key database, for example.

Figure 7:
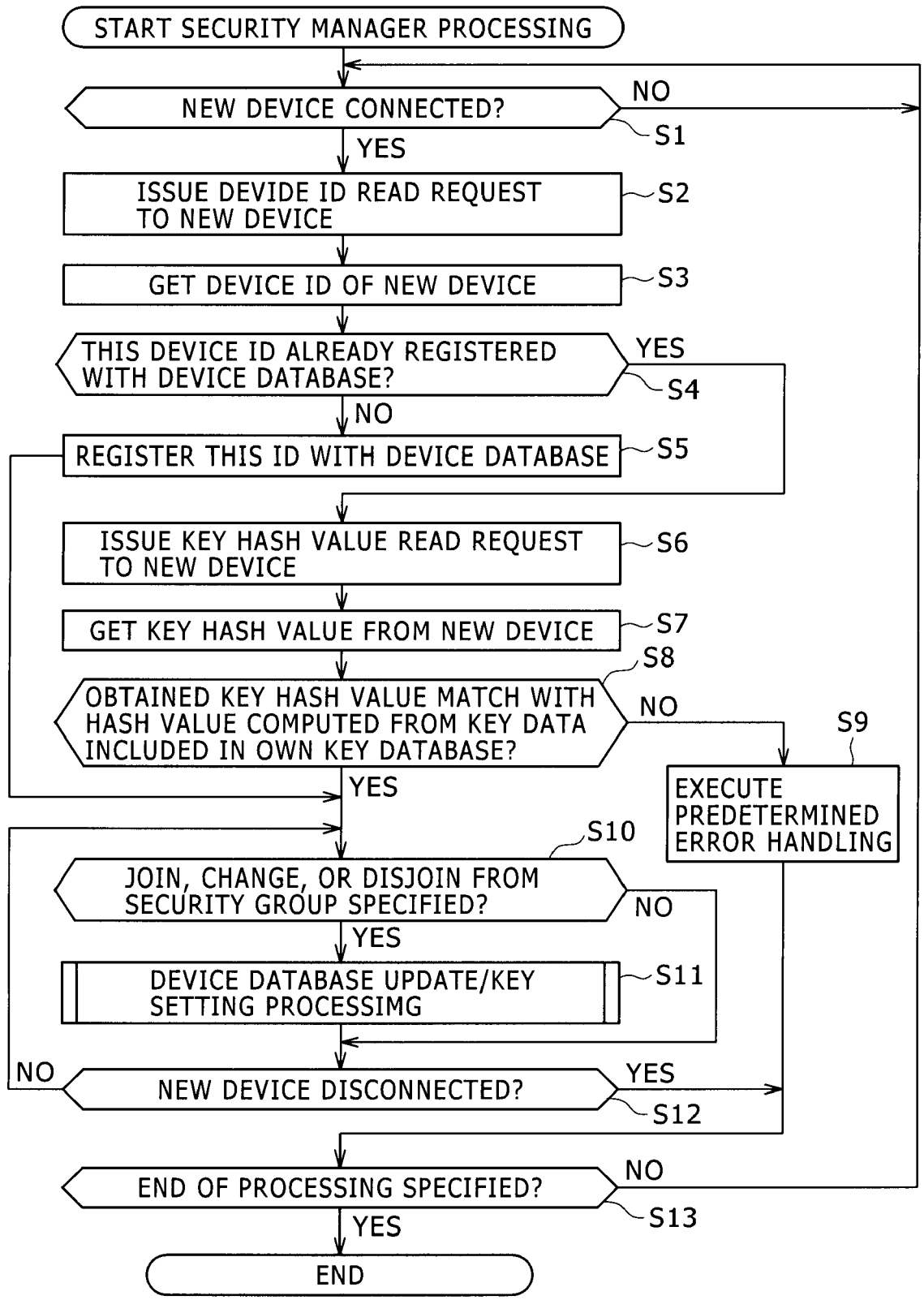
FIG. 7 is a flowchart indicative of a processing example of the security manager shown in FIG. 3.

The following describes in more detail a processing example of the security manager 21 with reference to the flowchart shown in FIG. 7.

In step S1, the security manager 21 determines whether a new device has been connected thereto.

If a no new device is found connected in step S1, then the procedure returns to step S1 to repeat the determination. Namely, the determination processing of step S1 is repeated until a new device is connected to the security manager 21, in which the security manager 21 is in a wait status.

When a new device is connected to the security manager 21, the decision in step S1 is YES, upon which the procedure goes to step S2.

In step S2, the security manager 21 issues a device ID read request to the newly connected device.

Then, as shown in steps S41 and S42 to be described later, in response to the device ID read request, the new device sends the requested device ID to the security manager 21.

In step S3, the security manager 21 receives the device ID to get the device ID of the new device.

In step S4, the security manager 21 determines whether the received device ID has already been registered with the device database (FIG. 5 and so on).

If the device ID is found not registered with the device database in step S4, then the security manager 21 goes to step S5 to register this device ID with the device database. It should be noted that, if the device category can also be determined from the device ID, the device category is also registered with the device database. Then, the procedure goes to step S10. The processing of step 10 and on will be described later.

On the other hand, if the device ID is found registered with the device database in step S4, then the procedure goes to step S6. In step S6, the security manager 21 issues a key hash value read request to the new device.

Then, as shown in steps S43 and S44 shown in FIG. 10 to be described later, the new device receives the key hash value read request and computes a key hash value from the key data owned by itself, sending the computed key hash value to the security manager 21.

In step S7, the security manager 21 receives the key hash value to get the key hash value of the new device.

In step S8, the security manager 21 determines whether the received key hash value matches the key hash value computed from the key data in the key database (FIG. 6 and so on) of the security manager 21.

If a mismatch is found in step S8, then the security manager 21 goes to step S9 to execute a predetermined error handling operation.

The above-mentioned predetermined error handling operation may be caused by the overwriting of the contents of the key register in the new device by another security manager (not shown) or the destruction of the contents of the key register in the new device due to other causes. Therefore, one example of the predetermined error handling processing is that a presumed cause of the mismatch between key hash values is presented to the operator (the manager for example) of the security manager 21, causes the operator to select whether to overwrite the key data on the basis of the contents of the key database, and executes the processing corresponding to the operation done by the operator.

After the predetermined error handling operation in step S9, the procedure goes to step S13, which will be described later.

On the other hand, if a match is found in step S8, then the procedure goes to step S10.

It should be noted that the reason for using a key hash value instead of key data in the processing of steps S6 through F8 shown in FIG. 7 is that the key data itself is protected against the reading from outside the device so as to maintain the secrecy of the key. If the key setting is not made on the device, the key data is assumed to be zero and a hash value corresponding to zero is read to be sent to the security manager 21.

Although not included in the processing steps shown in FIG. 7, if the decision is YES in step S8, then the security manager 21 is ready for recognizing the status of the connected new device, so that, at this moment, the icon 161 of the new device is displayed in the area 153 or the area 154 of the GUI image shown in FIG. 4. Namely, if the new device has not been joined to the security group 51, the icon 161 is displayed in the area 153. Because the new device is connected to the security manager 21, the text made up of device category and device ID is not enclosed by parentheses. On the other hand, if the new device has already been joined to the security group 51, for example, the parentheses around the text of the corresponding icon 161 in the area 154 of the window 152 are removed.

If the decision in step S8 is YES as described above, then the security manager 21 goes to step S10 to determine whether joining of the new device to the security group 51, changing of security groups, or disjoining of the new device from the security group 51 has been specified by the operator.

If no specification is found, the then decision in step S10 is NO, upon which the procedure goes to step S12, which will be described later.

If the icon 161 of the new device has been dragged from the area 153 to the area 154 with the GUI image shown in FIG. 4 displayed, for example, then, it is determined in step S10 that joining to the security group 51 has been specified, upon which the procedure goes to step S1.

If the icon 161 of the new device has been dragged from the area 154 to the area 153 with the GUI image shown in FIG. 4 displayed, for example, then it is determined in step S10 that disjoining from the security group 51 has been specified, upon which the procedure goes to step S11.

Specification for changing security groups will be described later with reference to FIG. 13.

In step S11, the security manager 21 updates the key data of the key register in the new device in accordance with the specification made in step S10 to execute key setting, thereby updating the device database involved in the key setting. In what follows, the processing done in step S11 is referred to as device database update/key setting processing, details of which will be described later with reference to FIG. 8.

When the above-mentioned device database update/key setting processing of step S11 has been completed or if the decision in step S10 is NO, the procedure goes to step S12. In step S12, the security manager 21 determines whether the new device has been disconnected or not.

If the new device is found not disconnected in step S12, then the procedure returns to step S10 to repeat the above-mentioned processing therefrom.

On the other hand, if the new device is found disconnected in step S12, then the procedure goes to step S13. Also, if the processing of step S9 has been executed, the procedure goes to step S13. In step S13, the security manager 21 determines whether the end of processing has been specified or not.

If the end of processing is found not specified in step S13, then the procedure returns to step S1 to repeat the above-mentioned processing therefrom.

On the other hand, if the end of processing is found specified in step S13, then the processing by the security manager 21 comes to an end.

It should be noted that FIG. 7 shows an example in which there is one device that is connected to the security manager 21; if two or more devices are connected to the security manager 21 at the same time, the processing of steps S2 through S11 may be thread-activated, for example.

Figure 8:
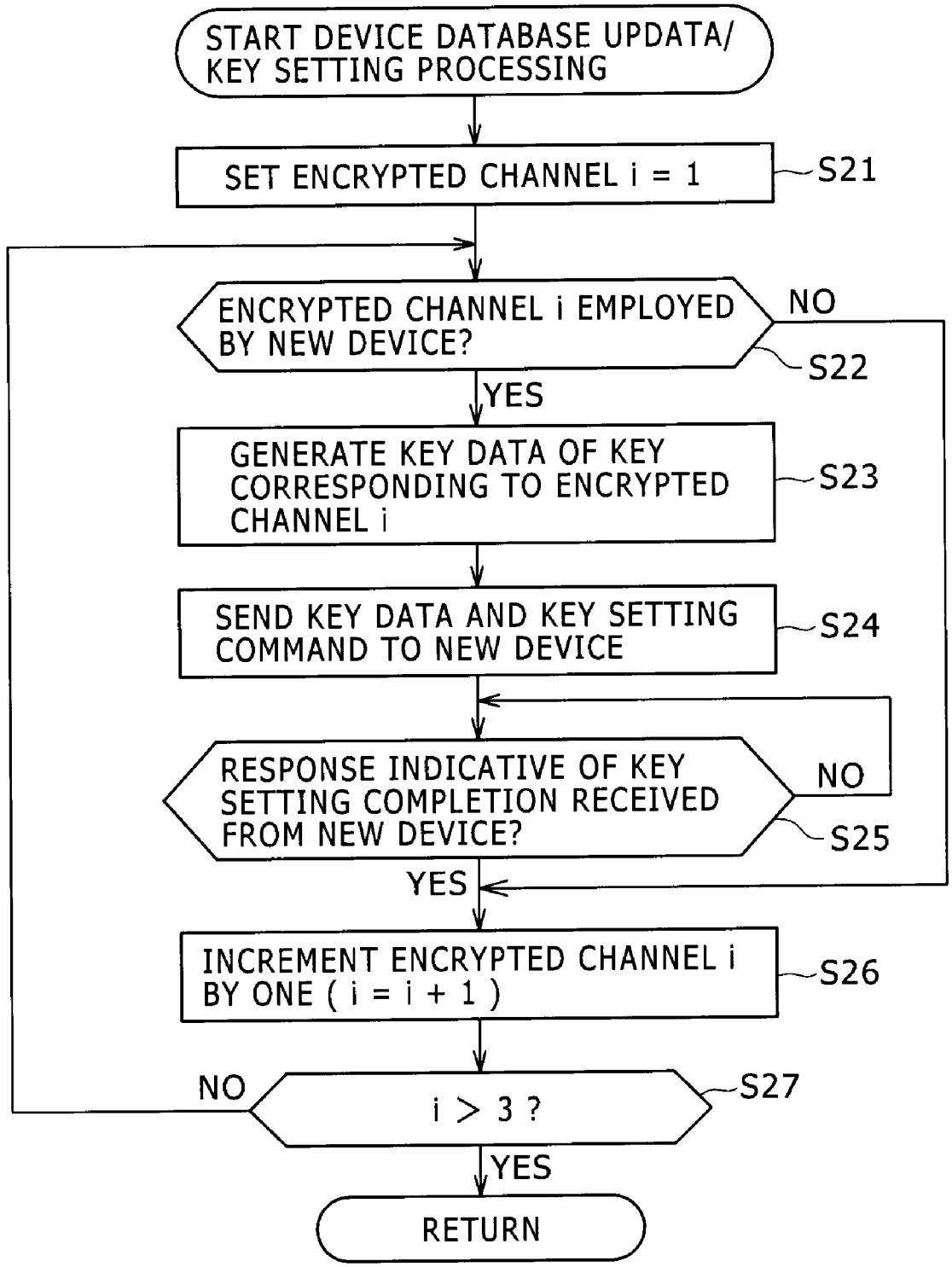
FIG. 8 is a flowchart indicative of a detail example of device database update/key setting processing of the processing operations to be executed by the security manager shown in FIG. 7.

The following describes a detail example of the device database update/key setting processing of step S1 shown in FIG. 7 with reference to the flowchart shown in FIG. 8.

In step S21, the security manager 21 sets encrypted channel i=1.

Encrypted channel i denotes an identifier indicative of a transmission form in which encrypted content is transmission as shown in FIG. 9. This identifier is uniquely related with a key to be used for encrypting the content to be transmitted in that transmission form. Namely, in the example shown in FIG. 1, encrypted channel i=1 denotes a disc media, the recording media 11 in the example shown in FIG. 1 for example, and is therefore related with the D key 62. Encrypted channel i=2 denotes a network interface, the interface based on the network 6 in the example shown in FIG. 1 for example, and is therefore related with the N key 63. Encrypted channel i=3 denotes the HD-SDI interface, the interface based on the signal lines 31-1 through 31-3 in the example shown in FIG. 1 for example, and is therefore related with the LE key 61. It should be noted that the table shown in FIG. 9 is stored beforehand in the security manager 21, the secure memory 104 or the ROM 102, for example, shown in FIG. 3.

Referring to FIG. 8 again, in step S22, the security manager 21 determines whether the new channel uses encrypted channel i or not.

For example, in the decision processing of step S22 to be executed after the processing of step S21, encrypted channel i is set to 1, so that the decision is YES if the new device uses a disc media. Namely, if the camcorder 1 or the deck 2 having a capability of reading the recording media 11 in the example of FIG. 1 is connected to the security manager 21 as a new device, the decision is YES. In contrast, if the new devices does not use a disc media, the decision NO. Namely, if the material server 3 having no capability of reading the recording media 11 in the example of FIG. 1 is connected to the security manager 21 as a new device, the decision is NO.

If the decision is NO in step S22, then the procedure goes to step S26, which will be described later.

If the decision is YES in step S22, then the procedure goes to step S23. In step S23, the security manager 21 generates key data for the key corresponding to encrypted channel i.

To be more specific, in joining a new device to the security group 51, the security manager 21 generates a key by reading the key data from the key database (FIG. 6) for the key corresponding to encrypted channel i in step S23. For example, if encrypted channel i=1, the key data of the D key 62, namely, in the example shown in FIG. 6, "a4-3*f*-dd-9*e*-d7-0b-f3-9*l*", is read.

On the other hand, in disjoining the new device from the security group 51, the security manager 21 generates zero as the key data for the key corresponding to encrypted channel i. In this case, zero is set to the new device as the key data. Any device to which zero is set will not execute content encryption and decryption processing by bypassing the encryption and decryption capabilities.

In step S24, the security manager 21 sends key data and a key setting command to the new device.

In step S25, the security manager 21 determines whether a response indicative of the completion of key setting has come from the new device.

If the response indicative of the completion of key setting is found not made in step S25, then the security manager 21 determines again whether the response indicative of the completion of key setting has been made by the new device. Namely, the security manager 21 is put in a wait state in which to repeat the decision processing of step S25 until this response is made by the new device.

During this state, the new device receives the key data and the key setting command, stores the received key data and key setting command into the key register, and sends a response indicative of the completion of key setting to the security manager 21 as shown in steps S45 through S47, S48 through S50, and S51 through S53 of FIG. 11, which will be described later.

Then, the security manager 21 determines YES in step S25 upon reception of this response and goes to step S26.

In step S26, the security manager 21 increments encrypted channel i by one (i=i+1).

In step S27, the security manager 21 determines whether i is greater than three (i>3).

If encrypted channel i is found to be two or three after step S26, the decision in step S27 is NO, upon which the procedure returns to step S22 to repeat the above-mentioned processing therefrom.

On the other hand, if encrypted channel i is found to be four after step S27, then the decision YES in step S27, upon which the device database update/key setting processing comes to an end. Namely, the processing of step S11 shown in FIG. 7 ends, upon which the procedure goes to step S12.

It should be noted that the device database may be updated in each item of the key data corresponding to that encrypted channel i every time the response of key setting completion is made for each of encrypted channel i, namely, every time the decision in step S25 is YES or may be collectively updated after the processing of step S27.

Figure 10:
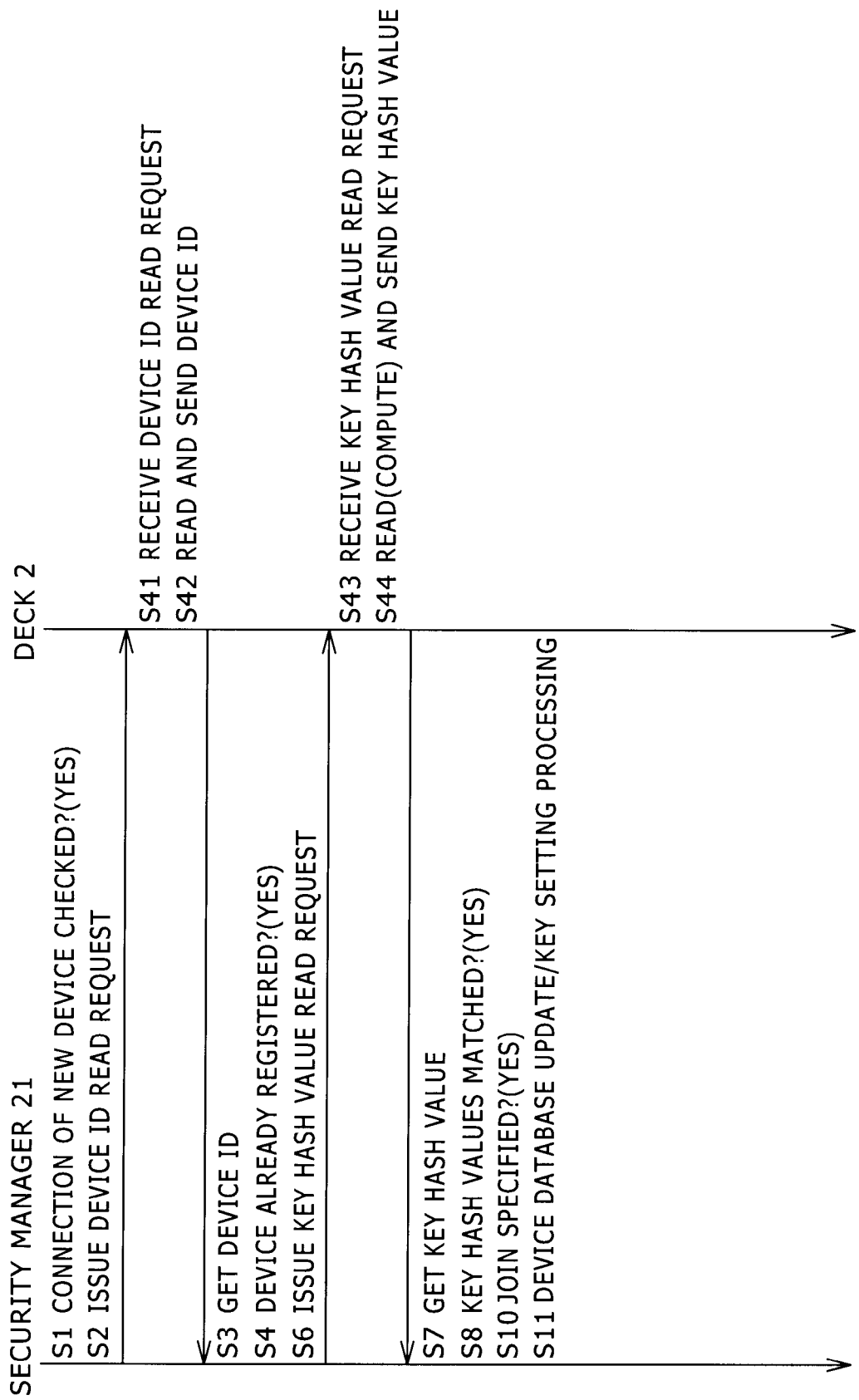
FIG. 10 is a flowchart indicative of a processing example on the deck side for the processing by the security manager shown in FIGS. 7 and 8.
Figure 11:
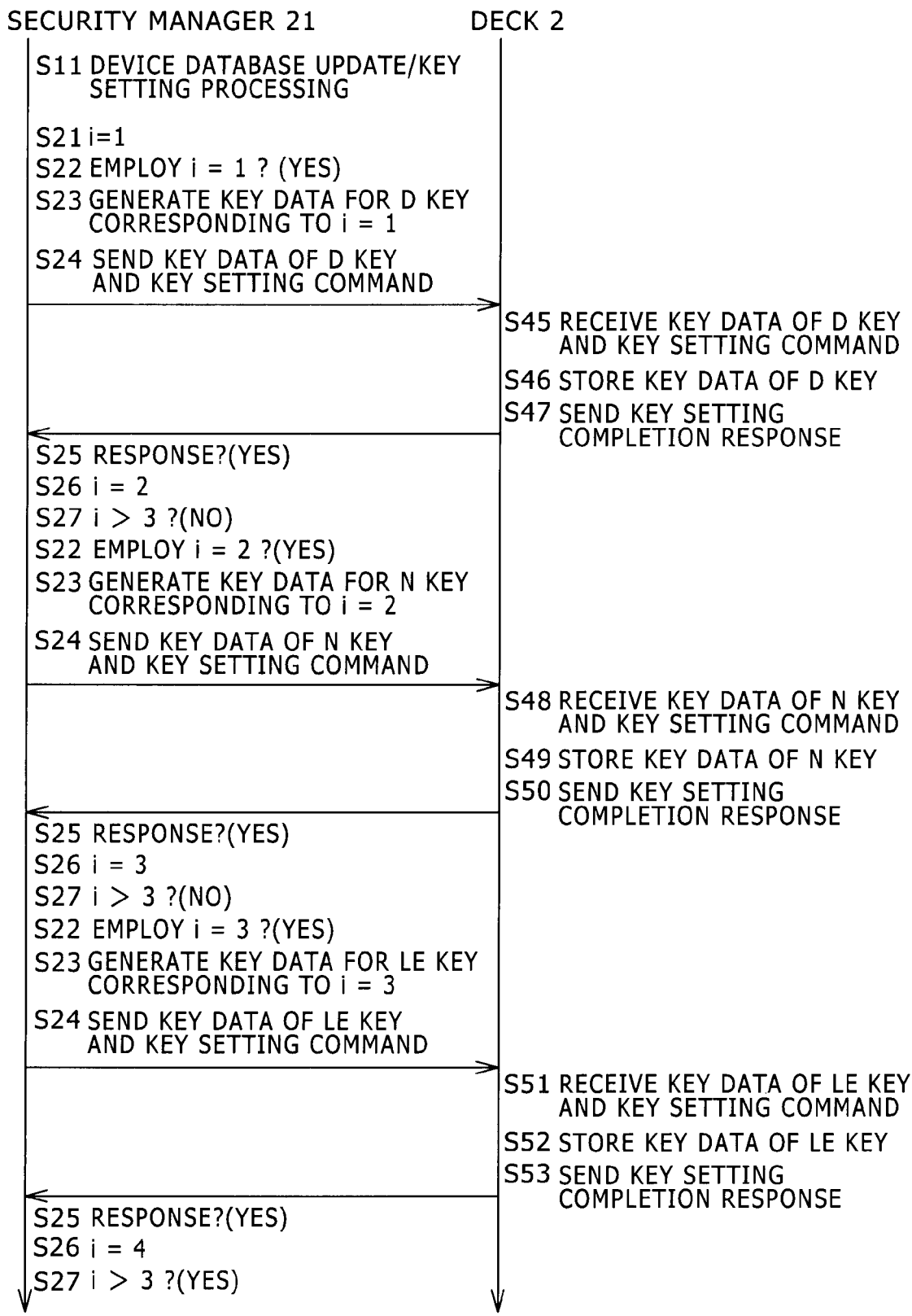
FIG. 11 is a flowchart indicative of another processing example on the deck side for the processing by the security manage shown in FIGS. 7 and 8.

FIGS. 10 and 11 are flowcharts indicative of an exemplary relationship between the security manager 21 and the deck 2 when the deck 2 shown in FIG. 1 is connected to the security manager 21 as the a new device onto which key setting is executed by the processing by the security manager 21 as described above.

So, the following describes an example of processing to be executed by the deck 2 onto which key setting is executed by the security manager 21, with reference to FIGS. 10 and 11.

In FIG. 10, when a device ID read request is issued from the security manager 21 in step S2 as described above, the deck 2 receives the device ID read request in step S41, reads the own device ID from the device ID memory 74 (FIG. 2) in step S42, and sends the device ID to the security manager 21.

Then, when a key hash value read request is issued from the security manager 21 in step S6 as described above, the deck 2 receives the key hash read request in step S43, reads (or computes) the key hash value from the key data stored in the key register 76 (FIG. 2) in step S44, and sends the key hash value to the security manager 21.

Next, when the security manager 21 executes device database update/key setting processing, the deck 2 executes the processing shown in FIG. 11 in response.

Namely, as described above, the security manager 21 sets encrypted channel i=1 in step S2 and then the processing of steps S22 and S23 is executed. In step S24, the key data of the D key 62 and a key setting command are sent to the deck 2.

Then, the deck 2 receives the key data of the D key 62 and the key setting command in step S45. In step S46, the deck 2 stores the key data into the key register 76. In step S47, the deck 2 sends a response indicative of key setting completion to the security manager 21.

The security manager 21 determines YES in step S25 as described above. In step S26, encrypted channel i is set to two (i=2). Then, the processing of steps S27, S22, and S23 is executed. In step S24, the key data of the N key 63 and a key setting command are sent to the deck 2.

In step S48, the deck 2 receives the key data of the N key 63 and the set setting command. In step S49, the deck 2 stores the received key data into the key register 76. In step S50, the deck 2 sends a response indicative of key setting completion to the security manager 21.

Then, as described above, the security manager 21 determines YES in step S25. In step S26, encrypted channel i is set to three (i=3) and then the processing of steps S27, S22, and S23 is executed. In step S24, the key data of the LE key 61 and a key setting command are sent to the deck 2.

In step S51, the deck 2 receives the key data of the LE key 61 and the key setting command. In step S52, the deck 2 stores the received key data into the key register 76. In step S53, the deck 2 sends a response indicative of key setting completion to the security manager 21.

Then, as described above, the security manager 21 determines YES in step S25. This time, encrypted channel i is set to four (i=4) in step S26, so that the decision in step S27 is YES, upon which the device database update/key setting processing comes to an end.

It should be noted that, although not shown in the flowchart, the security manager 21 may send the data listed in the above-mentioned relation table shown in FIG. 9 to the deck 2 as necessary. In this case, by referencing this table, the CPU 71 of the deck 2 can easily execute the processing of providing the key data stored in the key register 76 to appropriate component blocks.

In the above-mentioned example, only one security group, the security group 51, is arranged in the system; it is also practicable to arrange two or more security groups.

If there are two or more security groups, the security manager 21 may be arranged to each one of the security groups to manage these groups individually.

Figure 12:
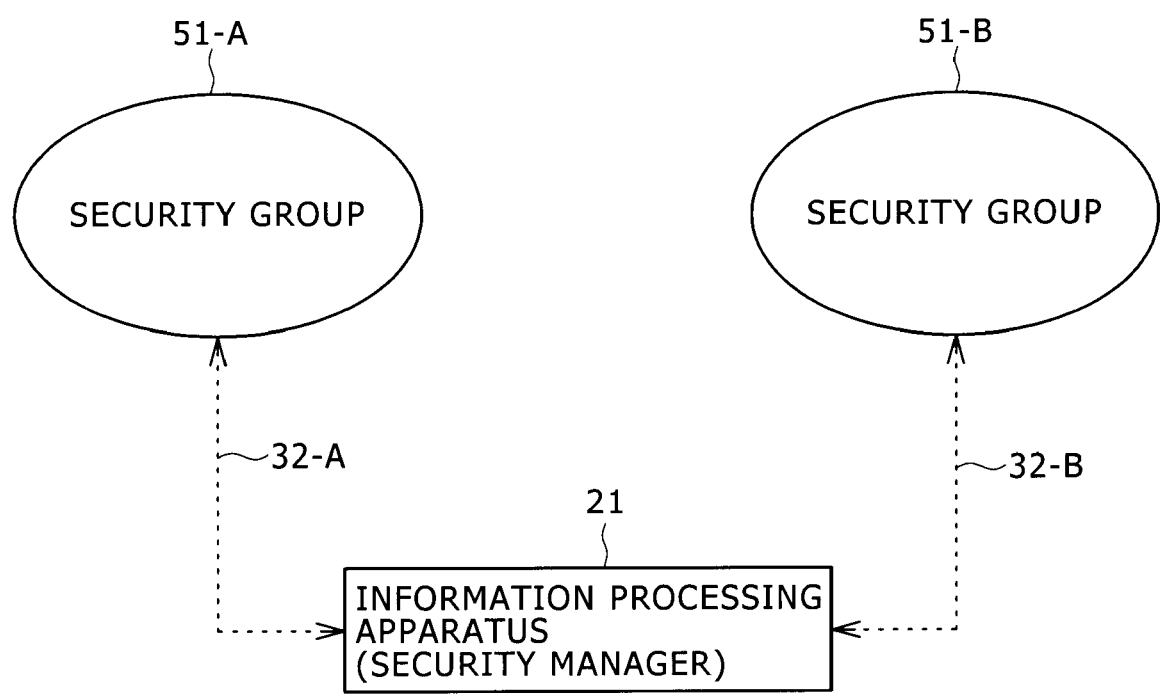
FIG. 12 is a block diagram illustrating an exemplary configuration with two or more security groups formed in the information processing system to which an embodiment of the invention is applied.

Alternatively, one security manager 21 may manage all of these security groups 51. For example, FIG. 12 shows an example, in which one security manager 21 collectively manages two security groups 51-A and 51-B. It should be noted that, in FIG. 12, a signal line 32-A denotes a line in which the connection lines of the devices joining the security group 51-A, namely, connection lines 32-1 through 32-5 shown in FIG. 1, are bundled. Likewise, a signal line 32-B is a signal line in which the connection lines of the devices joining the security group 51-B are bundled.

If the two security groups 51-A and 51-B are formed as shown in the example of FIG. 12, the security manager 151 uses a GUI image as shown in FIG. 13. The GUI image shown in FIG. 13 displays a window 152-1 for the security group 51-A and a window 152-2 for the security group 51-B.

The user operation to be executed in this case is basically the same as the operation described above with reference to FIG. 4. The reason why term "basically" is used is that the user further executes an operation of dragging the icon 161 shown in the area 154-1 of the window 152-1 of the security group 51-A to the area 154-2 of the window 152-2 of the security group 51-B, thereby disjoining a device joined to the security group 51-A and joining this device to the security group 51-B. Likewise, the user executes an operation of dragging the icon 161 shown in the area 154-2 of the window 152-2 of the security group 51-B to the area 154-1 of the 152-1 of the security group 51-A, thereby disjoining a device from the security group 51-B and joining the device to the security group 51-A. An instruction based on these dragging is the security group change instruction in step S10 shown in FIG. 7.

Also, if the two security groups 51-A and 51-B are formed as shown in FIG. 12, the device database is as shown in FIG. 14, for example. "Group A" in "Security Group" denotes the security group 51-A and "Group B" denotes the security group 51-B.

If the two security groups 51-A and 51-B are formed as shown in FIG. 12, the key database is as shown in FIG. 15, for example.

Here, the following two points should be taken into consideration. Namely, first, different key data has to be used between different security groups, the security group 51-A and the security group 51-B, so as to prevent the content stored in these security groups from being leaked outside.

Secondly, if the same value is used for the key data of the D key 62, N key 63, and the LE key 61 within the same security group, this will not lead to the leakage of the content to another security group. However, in order to minimize the influence to the entire encrypted production environment in case that any one of the D key 62, the N key 63, and LE key 61 is broken, it is desired to use different values for the key data of the D key 62, N key 63, and the LE key 61 within the same security group. However, the use of different key data values will not increase the manager or user load because these keys may be managed not manually but the security manager 21.

It should be noted that, in the above-mentioned embodiment, the joining to and disjoining from the security group 51 is executed through the GUI operation on the security manager 21; however, it is also practicable to execute this operation through a command line operation, a table operation or a mail-based command sending/receiving operation, for example.

In the example shown in FIG. 3, the security manager 21 is configured by a personal computer; however, it is also practicable to configure the security manager 21 by a portable information terminal for example. Alternatively, one of the content-encrypted devices joining the security group 51 may be selected for a master device to have the function of the security manager 21.

In the above-mentioned embodiment, the key-based encryption once set to the devices joining the predetermined security group 51 remains valid thereafter; however, it is also practicable to clear the key register of each device by setting a predetermined timing, thereby invalidating the encryption, for example.

In the above-mentioned embodiment, the functions of the encryptor and the decryptor in each device are operated all at the same time; however, it is also practicable to bypass the decryptor function so as to capture unencrypted content from outside the security group 51 to which that device joins, for example.

In the above-mentioned embodiment, the value of the key register set by the security manager 21 in each device joining the security group 51 is directly supplied to the encryptor and the decryptor to be used for the computation of encryption and decryption. However, it is also practicable to use, in the encryptor and the decryptor of each device, a key and a key list to be generated and stored in a method other than that used in the above-mentioned embodiment and use the key data of the key register of each device so as to encrypt these key and key list for secrecy, for example. Alternatively, the key data of the key register may be used for cross authentication of the devices, thereby exchanging keys. Alternatively still, it is practicable to synthesize a media-unique ID and the key data of the key register by use of a hash function and use a resultant value for computing the encryption and decryption by the encryptor and decryptor.

In the above-mentioned embodiment, the key data to be sent from the security manager 21 in step S24 shown in FIG. 8 for example is not encrypted; however, it is also practicable to send encrypted key data. For example, making each device hold a public-key encryption computation capability and embedding a public-key certificate in each device instead of the device ID can impart secrecy to the communication between the security manager 21 and each device by use of public-key encryption.

As described above, the novel configuration of the invention allows the realization of the encryption of data to be recorded and transmitted, thereby realizing the security group 51 that can ruggedly protect content, without changing related-art operations. In addition, the use of the security manager 21 significantly makes easy the management of the security group 51.

To be more specific, the realization of the security group 51 in video production environment makes it practicable to realize the video production compatible with both secrecy and availability in content-protected environment. Compared with the situation prior to the introduction of encryption-compliant devices, the novel configuration according to one embodiment of the present invention allows the video production in content-protected environment without changing an operational method and the ready use of each device because the encrypted key is embedded in each device. Consequently, the leakage of content from a total process beginning with the taking of materials and ending with package completion can be ruggedly prevented without impairing the ease of use.

In addition, the encryption key for each device is automatically set by the security manager 21, so that the manual management of encryption keys and security groups need not be executed unlike the environment in which the security manager 21 is not used, namely, related-art techniques are practiced, for example.

Further, after setting the encryption key to each device, the security manager 21 can be disconnected from the device as desired, so that the demands for the device installation space can be minimized. For example, the devices remotely connected by the HD-SDI dedicated line can be operated as the same security group 51.

In the example shown in FIG. 12, where one security manager 21 collectively manages two security groups 51-A and 51-B, these security groups often trust each other. In such a situation, it may be easily supposed that there be a demand for the content outputted a deck joining the security group 51-A to be recorded to a deck joining to the security group 51-B (hereafter referred to as an inter-security-group transfer demand), for example. However, as described above, the security groups 51-A and 51-B use different key data values to independently execute encryption and decryption, so that the situation in the example shown in FIG. 12 may not satisfy the inter-security-group transfer demand.

Figure 16:
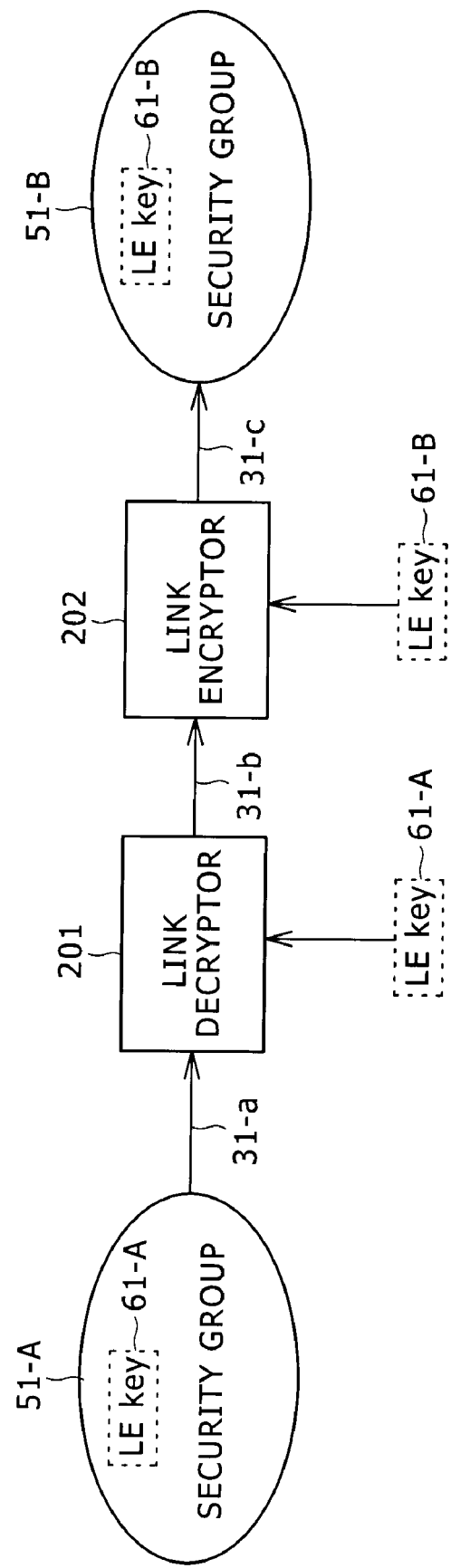
FIG. 16 is a schematic diagram illustrating an exemplary technique for executing content protection in the content transmission based on the HD-SDI between two security groups shown in FIG. 12.

Therefore, a technique shown in FIG. 16 is taken as a measure for satisfying the inter-security-group transfer demand, for example. To be more specific, the inter-security-group transfer demand can be satisfied by routing the two security groups 51-A and 51-B by connecting the deck of the security group 51-A and a link decryptor 201 with a signal line 31-*a* of HD-SDI interface, the link decryptor 201 and a link encryptor 202 with a signal line 31-*b* of HD-SDI interface, and the link encryptor 202 and the deck of the security group 51-B with a signal line 31-*c* of HD-SDI interface.

Namely, the deck of the security group 51-A encrypts the content with an LE key 61-A and sends the encrypted content to the link decryptor 201 via the signal line 31-*a* in the form of an HD-SDI signal. The link decryptor 201 decrypts this encrypted content with the LE key 61-A that is valid in the security group 51-A and sends the decrypted content to the link encryptor 202 via the signal line 31-*b* in the form of an HD-SDI signal. The link encryptor 202 encrypts this decrypted content with an LE key 61-B that is valid in the security group 51-B and sends the encrypted content to the deck of the security group 51-B via the signal line 31-*c* in the form of an HD-SDI signal. The security group 51-B decrypts this encrypted content with the LE key 61-B and records the decrypted content. Thus, the inter-security-group transfer demand can be satisfied.

However, in the technique shown in FIG. 16, the content to be transmitted over the signal line 31-*b* in the form of HD-SDI signal is not encrypted, namely, unencrypted content gets out of the security groups 51-A and 51-B, so that it is possible for the content to be intercepted from this external line 31-*b* (this problem being hereafter referred to as an external interception problem).

Figure 17:
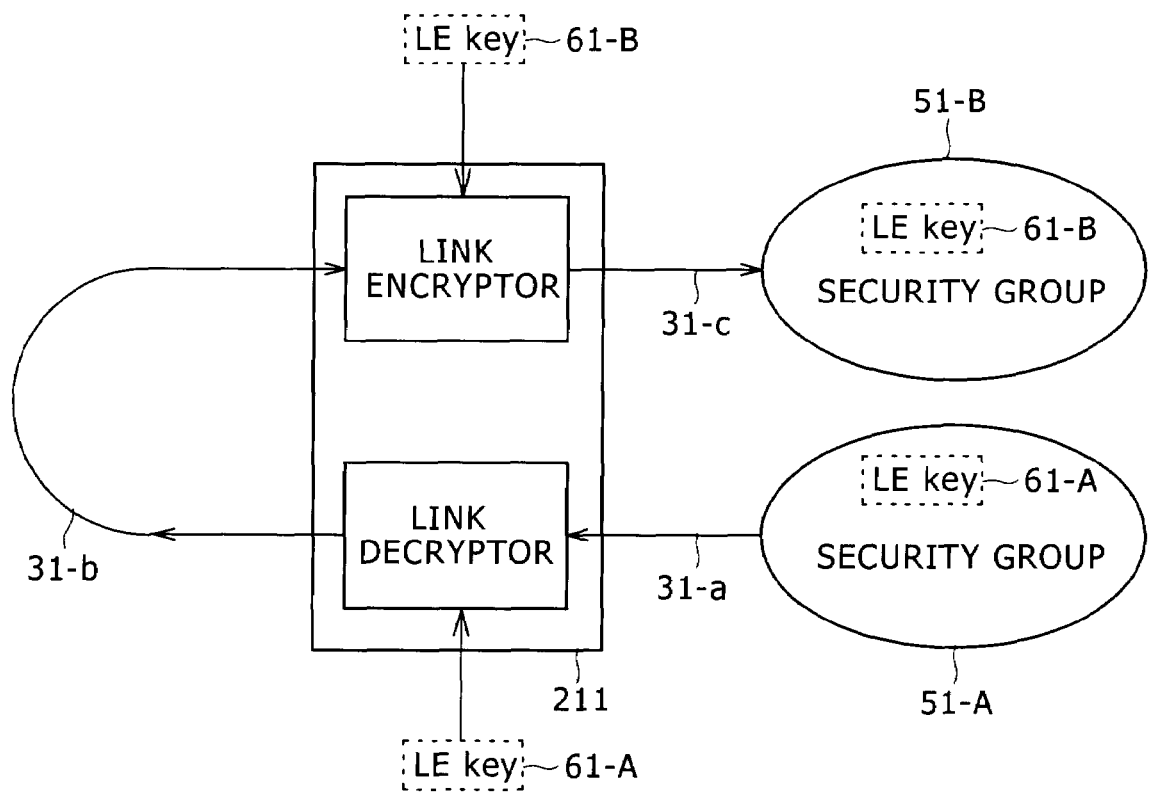
FIG. 17 is a schematic diagram illustrating another exemplary technique for executing content protection in the content transmission based on the HD-SDI between two security groups shown in FIG. 12.

For another technique for satisfying the inter-security-group transfer demand, the two security groups 51-A and 51-B are routed each other by use of a link encryptor/link decryptor unitized device 211 that allows bidirectional transmission by a single unit of device as shown in FIG. 17, for example.

In this case, the deck of the security group 51-A encrypts the content with the LE key 61-A and sends the encrypted content to the link decryptor of the device 211 via the signal line 31-*a* in the form of HD-SDI signal. The link decryptor decrypts this encrypted content with the LE key 61-A that is valid in the security group 51-A and sends the decrypted content to the link encryptor of the same device 211 via the signal line 31-*b* in the form of HD-SDI signal. The link encryptor encrypts the decrypted content with the LE key 61-B that is valid in the security group 51-B and sends the encrypted content to the deck of the security group 51-B via the signal line 31-*c* in the form of HD-SDI signal. The deck of the security group 51-B decrypts with the LE key 61-B and records the decrypted content. Thus, the inter-security-group transfer demand can be satisfied.

However, like the technique shown in FIG. 16, the technique shown in FIG. 17 may cause the above-mentioned external interception problem; namely, because the content to be transmitted over the signal line 31-*b* in the form of HD-SDI signal is not encrypted, namely, unencrypted content gets out of the security groups 51-A and 51-B.

Consequently, in order to satisfy the inter-security-group transfer demand and solve the external interception problem at the same time, the inventor hereof proposes an information processing apparatus having a first function and a second function as shown below. To be more specific, in the first function, when encrypted content is entered from a sending source to be sent to a sending destination, the encrypted content is decrypted with a common key employed by the sending source, the decrypted content is encrypted again with a common key employed by the sending destination, and the encrypted content is outputted to the sending destination. In the second function, the above-mentioned sequence of processing is executed while transmitting the content through a route inside the information processing apparatus.

FIG. 18 shows one embodiment of the invention in which the information processing apparatus having the above-mentioned first and second functions is realized as a router.

A router 301 shown in FIG. 18 has a link decryptor 311 and a link encryptor 313, which are interconnected with a transmission block 312 in the router 301. The form of the transmission block 312 is not restricted to any particular one as far as information can be transmitted without being taken outside the router 301. For example, the transmission block 312 may be made up of a signal line, a bus line, or a configuration in which information is once stored in the RAM as shown in FIG. 2.

The above-mentioned router 301 operates as follows. Namely, the deck of the security group 51-A encrypts content with the LE key 61-A and sends the encrypted content to the link decryptor 311 of the router 301 via the signal line 31-*a* in the form of HD-SDI signal. The link decryptor 311 decrypts this encrypted content with the LE key 61-A that is valid in the security group 51-A and sends the decrypted content to the link encryptor 313 via the transmission block 312. The link encryptor 313 encrypts this decrypted content with the LE key 61-B that is valid in the security group 51-B and sends the encrypted content to the deck of the security group 51-B via the signal line 31-c in the form of HD-SDI signal. The deck of the security group 51-B decrypts this encrypted content with the LE key 61-B and records the decrypted content. Thus, the inter-security-group transfer demand can be satisfied.

In this case, the content that is obtained as a plaintext signal by decrypting the HD-SDI signal by the link decryptor 311 does not go outside the router 301, so that the interception of plaintext signals from outside the router 301 can be prevented. Namely, the external interception problem can be solved.

It should be noted that, although not shown in FIG. 18, the setting of the LE key 61-A and the LE key 61-B to the router 301 may be executed by the security manager 21 as shown in FIG. 12, for example.

Also, although not shown, it is practicable to add a tamper sensor configured to detect the opening or destruction of the chassis of the router 301. In this configuration, upon detection by this tamper sensor of the opening or destruction of the chassis, the operation of the link decryptor 311 may be suspended to protect the content to be transmitted through the transmission block 312 as a plaintext signal, the LE key 61-A or 61-B held in the router 301 may be deleted for key protection, or a detection event may be logged for notifying the manager of the router 301 thereof.

Further, a router compatible with encrypted network transfer files and recording media data on such as recording discs may be realized by functionally extending the router 301 for HD-SDI signal shown in FIG. 18. FIG. 19 shows an exemplary configuration of such a router.

Like the router 301 shown in FIG. 18, a router 321 shown in FIG. 19 includes a link decryptor 311 and a link encryptor 313, which are interconnected with a transmission block 312 in the router 321. The form of the transmission block 312 is not restricted to any particular one as far as information can be transmitted without being taken outside the router 321. For example, the transmission block 312 may be made up of a signal line, a bus line, or a configuration in which information is once stored in the RAM as shown in FIG. 2. Also, the transmission block 312 may share all or a part of other transmission blocks 332 and 342 to be described later.

Also, the router 321 includes a data decryptor 331 and a data encryptor 333, which are interconnected with a transmission block 332 in the router 321. The form of the transmission block 332 is not restricted to any particular one as far as information can be transmitted without being taken outside the router 321. For example, the transmission block 332 may be made up of a signal line, a bus line, or a configuration in which information is once stored in the RAM as shown in FIG. 2. Also, the transmission block 332 may share all or a part of other transmission blocks 312 and 342 to be described later.

Further, Also, the router 321 includes a packet decryptor 341 and a packet encryptor 343, which are interconnected with a transmission block 342 in the router 321. The form of the transmission block 342 is not restricted to any particular one as far as information can be transmitted without being taken outside the router 321. For example, the transmission block 342 may be made up of a signal line, a bus line, or a configuration in which information is once stored in the RAM as shown in FIG. 2. Also, the transmission block 342 may share all or a part of other transmission blocks 312 and 332 to be described later.

The following describes an operation to be executed by the above-mentioned router 321. However, the operations by the link decryptor 311 to the link encryptor 313 are substantially the same as the operation of the router 301 shown in FIG. 18, so that the description thereof will be skipped for brevity. Namely, the following sequentially describes the operations by the data decryptor 331 and the data encryptor 333 and the operations by the packet decryptor 341 and the packet encryptor 343 in this order.

The operations by the data decryptor 331 and the data encryptor 333 are executed as follows.

Namely, the deck for example of the security group 51-A encrypts content with the D key 62-A and records the encrypted content to a first recording media, not shown.

The first recording media recorded with the encrypted content is provided to the router 321 by the user for example.

Then, the router 321 reads the encrypted content from the first recording media and provides the encrypted content to the data decryptor 331 incorporated in the router 321. The data decryptor 331 decrypts the encrypted content with the D key 62-A that is valid in the security group 51-A and sends the decrypted content to the data encryptor 333 via the transmission block 332. The data encryptor 333 encrypts this decrypted content with the D key 62-B that is valid in the security group 51-B and outputs the encrypted content. The router 321 records the encrypted content to a second recording media, not shown.

It should be noted that the first and second recording media may be one unit of media or separate two units of media.

The second media recorded with the encrypted content is provided to the deck for example of the security group 51-B by the user for example.

The deck for example of the security group 51-B reads the encrypted content from the second recording media and decrypts the encrypted content with the D key 62-B.

In this case, the content as a plaintext signal obtained by decrypting the encrypted content read from the first recording media in the data decryptor 331 will not get outside the router 321, so that the interception of the plaintext signal from outside the router 321 can be prevented. Namely, the above-mentioned external interception problem can be solved.

It should be noted that, although not shown in FIG. 19, the setting of the D key 62-A and the D key 62-B to the router 321 may be executed by the security manager 21 as shown in FIG. 12, for example.

Also, although not shown, it is practicable to add a tamper sensor configured to detect the opening or destruction of the chassis of the router 321. In this configuration, upon detection by this tamper sensor of the opening or destruction of the chassis, the operation of the data decryptor 331 may be suspended to protect the content to be transmitted through the transmission block 332 as a plaintext signal, the D key 62-A or 62-B held in the router 321 may be deleted for key protection, or a detection event may be logged for notifying the manager of the router 321 thereof.

For the operations of the data decryptor 331 and the data encryptor 333, the operations to be executed by the packet decryptor 341 and the packet encryptor 343 are as follows.

Namely, a device connected to a first network in the security group 51-A encrypts content with the N key 63-A and sends the encrypted content to the router 321 via the first network.

Then, the router 321 receives the encrypted content over the first network and supplies the received content to the packet decryptor 341 in the router 321. The packet decryptor 341 decrypts this encrypted content with the N key 63-A that is valid in the security group 51-A and sends the decrypted content to the packet encryptor 343 through the transmission block 342. The packet encryptor 343 encrypts this decrypted content with the N key 63-B that is valid in the security group 51-B and outputs the encrypted content. The router 321 sends the encrypted content to a second network in the security group 51-B.

Nest, the device connected to the second network in the security group 51-B receives the encrypted content and decrypts the received content with the N key 63-B.

In this case, the content as a plaintext signal obtained by decrypting the encrypted content sent from the first network in the packet decryptor 341 will not get outside the router 321, so that the interception of the plaintext signal from outside the router 321 can be prevented. Namely, the above-mentioned external interception problem can be solved.

It should be noted that, although not shown in FIG. 19, the setting of the N key 63-A and the N key 63-B to the router 321 may be executed by the security manager 21 as shown in FIG. 12, for example.

Also, although not shown, it is practicable to add a tamper sensor configured to detect the opening or destruction of the chassis of the router 321. In this configuration, upon detection by this tamper sensor of the opening or destruction of the chassis, the operation of the packet decryptor 341 may be suspended to protect the content to be transmitted through the transmission block 342 as a plaintext signal, the N key 63-A or 63-B held in the router 321 may be deleted for key protection, or a detection event may be logged for notifying the manager of the router 321 thereof.

It should be noted that the router 321 is not restricted to the unidirectional routing from the security group 51-A to the security group 51-B; it is also practicable for the router to have a bidirectional routing capability.

As described above, the number of security groups between which content is transmitted and received may be 3 or more. In this case, content to be transmitted and received between security groups can be relayed through a routing switcher. However, the direction application of a related-art routing switcher makes it difficult to satisfy the above-mentioned inter-security-group transfer demand and may cause the above-mentioned external interception problem.

The above-mentioned problems, the inter-security-group transfer demand and the external interception problem, may be solved by realizing a routing switcher as shown in FIG. 20 for example as an information processing apparatus having the above-mentioned first and second functions.

A routing switcher 351 in the example shown in FIG. 20 is configured as a routing switching for HD-SDI signal so as to make this switcher correspond to the router 301 for HD-SDI signal shown in FIG. 18. The routing switcher 351 is configured to have input terminals 361-$a$ through 361-$d$, link decryptors 362-$a$ through 362$d$, a cross-point switch 363, link encryptors 364-$a$ through 364-$d$, and output terminals 365-$a$ through 365-$d$.

The following describes operations of the above-mentioned routing switcher 351.

When encrypted content is outputted from a predetermined security group in the form of a HD-SDI signal to be inputted in an input terminal 361-$k$ (k indicative of any one of "a" through "d"), the inputted encrypted content is supplied to the link decryptor 362-$k$.

The link decryptor 362-$k$ decrypts this encrypted content with a LE key 61-$m$ (m indicative of any one of A through D) that is valid in the predetermined security group that outputted the encrypted content and supplies the resultant decrypted content to input i of the cross-point switch 363. It should be noted that input i is indicative of any one of 1 through 4; in the example shown in FIG. 20, input i=1 through 4 corresponds to the link decryptor 362-$k$=a through d, respectively.

Input i of the cross-point switch 363 is preset to be connected to output K. K is indicative of any one of A through D; in the example shown in FIG. 20, K=B corresponds to i=1, K=C corresponds to i=2, and K=D corresponds to i=3. Therefore, the content inputted in input i of the cross-point switch 363 is outputted from output K thereof to be supplied to the link encryptor 364-$k$. It should be noted that the link encryptor 364-$k$="a" through "d" corresponds to the output K=A through D, respectively.

The link encryptor 364-$k$ encrypts the content supplied from the cross-point switch 363 with the LE key 61-$p$ (p indicative of any one of A through D) that is valid in the security group of output destination and outputs the resultant encrypted content from the output terminal 365-$k$ in the form of HD-SDI signal. Then, the encrypted content is transmitted to the security group of output destination. Thus, the inter-security-group transfer demand can be satisfied.

In this case, the content as a plaintext signal obtained as a result of the decryption of the HD-SDI signal in the link decryptor 362-$k$ will not get outside of the routing switcher 351, so that the interception of plaintext signals from outside the routing switcher 351 can be prevented. Namely, the external interception problem can be solved.

It should be noted that, although not shown in FIG. 20, the setting of the LE keys 61-A through 61-D to the routing switcher 351 may be executed by security manager 21 as shown in FIG. 12 for example. From the viewpoint of the routing switcher 351, the value (or key data) of each of the LE keys 61-A through 61-D that can be set may be any value; namely, different key data may be set to the link encryptor 364-$k$ and the link decryptor 362-$k$ in accordance with the security group of connection destination or the same key data may be set to all or a part of the link encryptor 364-$k$ and the link decryptor 362-$k$.

Although not shown, it is practicable to add a tamper sensor configured to detect the opening or destruction of the chassis of the routing switcher 351. In this configuration, upon detection by this tamper sensor of the opening or destruction of the chassis, the operation of the link decryptor 362-$k$ may be suspended to protect the content to be transmitted through the cross-point switch 363 as a plaintext signal, the LE keys 61-A through 61-D held in the routing switcher 351 may be deleted for key protection, or a detection event may be logged for notifying the manager of the routing switcher 351 thereof.

Thus, the application of the routing switcher 351 allows the simultaneous handling of a maximum of four security groups in the IN and OUT bidirectional routing or a maximum of eight security groups in the IN or OUT unidirectional routing.

Further, the flow of an HD-SDI signal as encrypted content can be restricted as follows by setting the routing switcher 351 as follows, for example; namely, from input terminal 361-$a$ to output terminal 365-$b$ to input terminal 361-$b$ to output terminal 365-$c$ to I to input terminal 361-$c$ to output terminal 365-$d$.

To be more specific, the LE key 61-A is set to the link decryptor 362-$a$ connected to the input terminal 361-$a$ and the link encryptor 364-$a$ connected to the output terminal 365-$a$. The LE key 61-B is set to the link decryptor 362-$b$ connected to the input terminal 361-$b$ and the link encryptor 364-$b$ connected to the output terminal 365-$b$. The LE key 61-C is set to the link decryptor 362-$c$ connected to the input terminal 361-$c$ and the link encryptor 364-$c$ connected to the output terminal 365-$c$. The LE key 61-D is set to the link decryptor 362-$d$ connected to the input terminal 361-$d$ and the link encryptor 364-$d$ connected to the output terminal 365-$d$. In addition, the cross-point switch 363 is set so as to connect input 1 to output B, input 2 to output C, and input 3 to output D. These settings can restrict the flow of a HD-SDI signal as encrypted content to input terminal 361-*a* to output terminal 365-*b* to input terminal 361-*b* to output terminal 365-*c* to input terminal 361-*c* to output terminal 365-*d*, for example.

Figure 21:
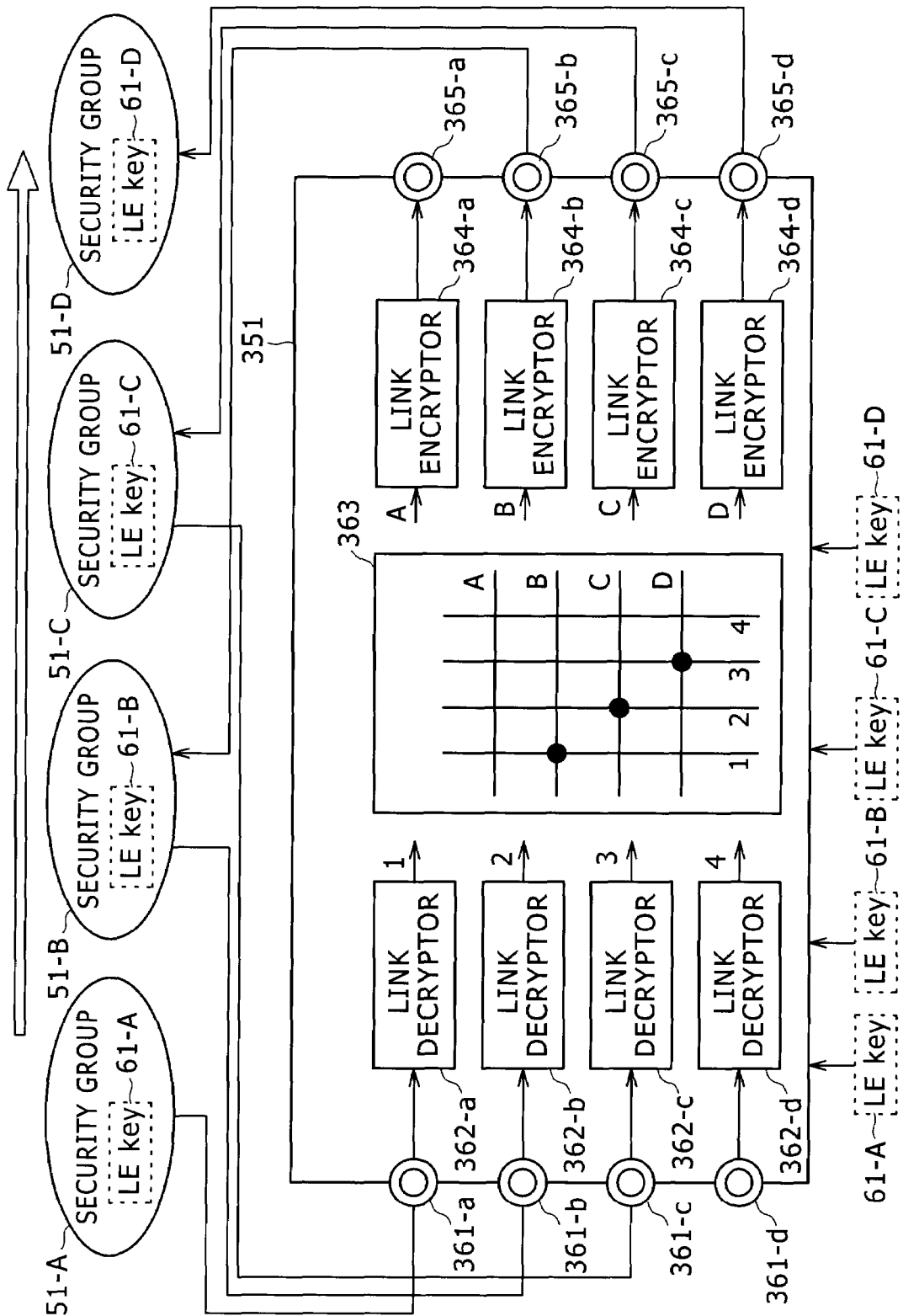
FIG. 21 is a diagram illustrating exemplary application of the routing switch shown in FIG. 20.

Consequently, as shown in FIG. 21 for example, connecting the input terminal 361-*a* to the security group 51-A, the input terminal 361-*b* and the output terminal 365-*b* to the security group 51-B, the input terminal 361-*c* and the output terminal 365-*c* to the security group 51-C, and the output terminal 365-*d* to the security group 51-D can restrict the flow of a HD-SDI signal as encrypted content. Concretely, this flow is restricted to the security group 51-A to the security group 51-B to the security group 51-C to the security group 51-D as indicated by a white arrow shown in FIG. 21. Namely, the flow of signals between security groups can be controlled while protecting each HD-SDI signal by encryption, thereby realizing work flow control in each production environment.

In this case, if devices are directly connected with each other by an HD-SDI cable by bypassing the security group, the transfer of content based on an HD-SDI signal may not be done because the key data for encryption keys are different from each other. Namely, as far as the key data and the setting of cross-point switch 363 of the routing switcher 351 are securely managed, it is difficult to flow content by breaking the work flow.

The routing switcher 351 described above with reference to FIGS. 20 and 21 is not limited to the configurations shown therein; may take various other forms as follows.

For example, in the example shown in FIG. 21, only four link decryptors 362-*a* through 362-*d* and 4 link encryptors 364-*a* through 364-*d* are installed on the routing switcher 351 because the number of cross-point switches is four. Namely, in accordance with the number of cross-point switches, the number of link decryptors and the number of link encryptors to be installed on the routing switcher 351 can be adjusted.

In addition, the routing switcher 351 may have a capability of individually turning on/off the link decryptor function and the link encryptor function if possible.

Further, in the routing switcher 351, the transmission format for the routing may be a realtime transmission format other than HD-SDI.

Still further, in the routing switcher 351, operator authentication based on password for example may be provided so as to give the setting right to the operator who does operations such as key setting and the operation of the cross-point switch 363 for example.

Yet further, another device or a network port may be provided so as to provide key distribution from the security manager 21 to the routing switcher 351 shown in FIG. 12 and so on, for example.

In addition, a public key certificate may be provided so as to provide the secrecy of network communication and execute the device authentication from the security manager 21.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

Figure 22:
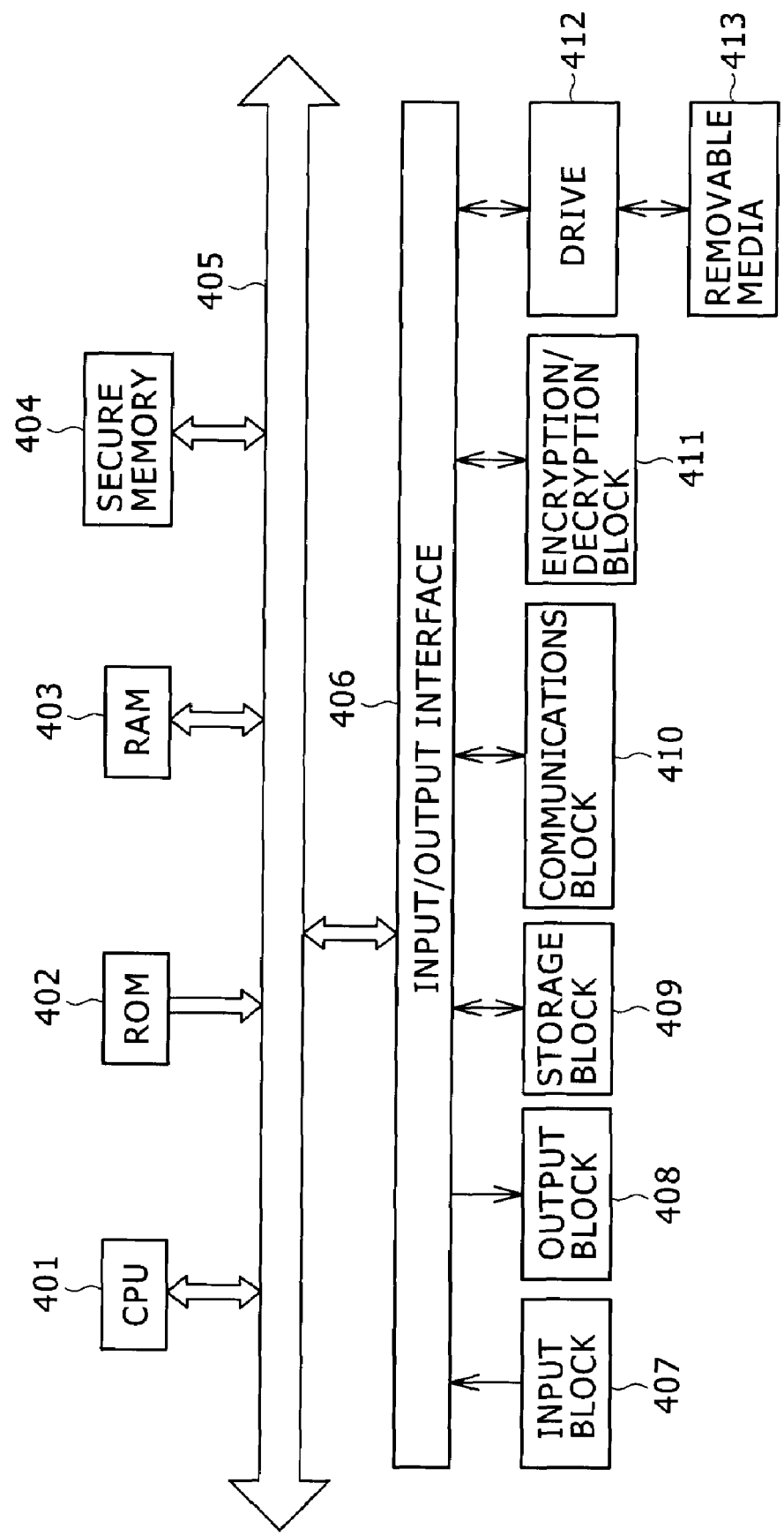
FIG. 22 is a block diagram illustrating an exemplary configuration of a personal computer that executes a program to which an embodiment of the invention is applied.

FIG. 22 is a block diagram illustrating an exemplary configuration of a personal computer that executes the above-mentioned sequence of processing in software approach.

Namely, in executing the above-mentioned sequence of processing by software, each of the devices belonging to each security group, the router, and the routing switcher may be configured by the personal computer of a part thereof shown in FIG. 22. It should be noted that the security manager may take the configuration of the computer shown in FIG. 3 to execute the processing by software.

Referring to FIG. 22, a CPU 401 executes various processing operations as instructed by programs stored in a ROM 402 or a storage block 409. A RAM 403 stores, from time to time, programs to be executed by the CPU 401 and data necessary for the execution. The data to be protected, such as key data, is stored in a secure memory 404 based on a nonvolatile memory, for example. The CPU 401, the ROM 402, the RAM 403, and the secure memory 404 are interconnected through a bus 405.

The CPU 401 is also connected with an input/output interface 406 via the bus 405. The input/output interface is connected with an input block 407 based on a keyboard, a mouse, and a microphone, for example, and an output block 408 based on a display monitor and a loudspeaker, for example. The CPU 401 executes various processing operations as instructed by the user through the input block 407. Then, the CPU 401 outputs processing results to the output block 408.

The storage block 409 connected to the input/output interface 406 is made up of a hard disc unit for example, storing programs to be executed by the CPU 401 and various kinds of data. A communications block 410 communicates with external devices via a network, such as the Internet or a LAN, for example. Alternatively, the communications block 410 communicates with external devices via a predetermined interface (HD-SDI for example). Still alternatively, the storage block 409 may get programs via the communication block 410 to store the obtained programs into the storage block 409.

An encryption/decryption block 411 encrypts content and decrypts encrypted content.

A drive 412 connected to the input/output interface 406 drives, when removable media such as a magnetic disc, an optical disc, a magneto-optical disc, or a semiconductor memory are loaded thereon to obtain programs and data from the loaded storage media. Programs and data thus obtained are transferred to the storage block 409 as necessary and stored therein.

As shown in FIGS. 3 and 22, program recording media for storing programs that are installed on a computer for execution is made up of the removable media 112 shown in FIG. 3 or the removable media 413 shown in FIG. 22 that are package media made up of a magnetic disc (including a flexible disc), an optical disc (including CD-ROM (Compact Disc-Read Only Memory), a DVD (Digital Versatile Disc), a magneto-optical disc. The program recording media is also made up of a semiconductor memory, the ROM 102 shown in FIG. 3 or the ROM 402 shown in FIG. 22 in which programs are temporarily or permanently stored, or a hard disc drive that forms the storage block 109 shown in FIG. 3 or the storage block 409 shown in FIG. 22. Storing of programs into program recording media is executed by use of wired or wireless communication media, such as a LAN, the Internet, or digital satellite broadcasting, via the communications block 110 shown in FIG. 3 or the communications block 410 shown in FIG. 22 that provides an interface, such as a router and a modem, as necessary.

It should be noted herein that the steps for describing each program recorded in recording media include not only the processing operations which are sequentially executed in a time-dependent manner but also the processing operations which are executed concurrently or individually.

It should also be noted that term "system" as used herein denotes an entire apparatus configured by a plurality of component units.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus configured to transfer first encrypted information from a sending source to a sending destination, comprising:
    a memory storing a first common key used in said sending source and a second common key, different from said first common key, used in said sending destination, wherein said first and second common keys are assigned by a security manager configured to manage setting of keys for said sending source and said sending destination based on a device database and a key database;
    a decryptor configured to decrypt said first encrypted information supplied from said sending source by use of said first common key to obtain decrypted information;
    an encryptor configured to encrypt said decrypted information decrypted by said decryptor by use of said second common key and to output second encrypted information as information to be transferred to said sending destination; and
    a transmitter configured to transmit said decrypted information decrypted by said decryptor to said encryptor through a predetermined route in said information processing apparatus,
    wherein the sending source is a first security group containing a first plurality of devices set to use the first common key,
    the security manager is arranged outside of the first security group and is further configured to determine whether a new device is connected to the security manager, acquire a device ID from the newly connected device, determine whether the newly connected device is registered in the device database based on the acquired device ID, register the newly connected device in the device database when it is determined that the newly connected device was not previously registered, determine whether the newly connected device is to join the security group, and when it is determined that the newly connected device is to join the security group, update the device database to associate the new device with the first common key, and
    said sending destination is configured as a second security group containing a second plurality of devices set to use the second common key, each of said security groups specifying that, when protection information is transmitted from a predetermined one of said first plurality of devices or said second plurality of devices to another one of said first plurality of devices or said second plurality of devices, respectively, said predetermined one device encrypts said protection information by use of said first or second common key to send resultant encrypted protection information and said another device receives said resultant encrypted protection information and decrypts said resultant encrypted protection information by use of said first or second common key, respectively.

2. The information processing apparatus according to claim 1, further comprising a plurality of decryptors and a plurality of encryptors, wherein said transmitter includes a cross-point switch configured to link each output of said plurality of decryptors to a preset one of said plurality of encryptors.

3. The information processing apparatus according to claim 1, wherein
    said common key of each security group is different,
    said decryptor decrypts first encrypted protection information sent from said sending source by use of said first common key set in said first security group of said sending source and outputs first resultant protection information,
    said transmitter transmits said decrypted first resultant protection information outputted from said decryptor to said encryptor, and
    said encryptor encrypts said decrypted first resultant protection information transmitted by said transmitter by use of said second common key set in said sending destination and outputs resultant second encrypted protection information as information to be transferred to said sending destination.

4. The information processing apparatus according to claim 3, wherein
    in each of said first security group as said sending source and said second security group as said sending destination, there are a plurality of transmission forms in which said resultant encrypted protection information is transmitted and different common keys are set to said plurality of transmission forms,
    a sequence including said decryptor, said transmitter, and said encryptor is arranged for each of said plurality of transmission forms,
    in each of the sequences, said decryptor executes decryption by use of the different common key of the transmission form corresponding to its own sequence among said plurality of different common keys set in said sending source, and
    said encryptor executes encryption by use of the different common key of the transmission form corresponding to its own sequence among said plurality of different common keys set in said sending destination.

5. The information apparatus according to claim 1, wherein said first common key is predetermined and embedded in said sending source, and said second common key is predetermined and embedded in said sending destination.

6. The information apparatus according to claim 1, wherein said security manager is configured to use a random number generator to generate said first and second common keys.

7. The information apparatus according to claim 1, further comprising a receiver configured to receive said first encrypted information from said sending source.

8. The information apparatus according to claim 1, further comprising a second transmitter configured to transmit said second encrypted information to said sending destination.

9. The information apparatus according to claim 1, wherein the security manager is further configured to provide a user interface that displays a status of each of the plurality of devices within each security group, display a status of the newly connected device, and provide functionality for a user to specify whether the newly connected device is to join one of the first and second security groups.

10. The information apparatus according to claim 9, wherein the user interface displays an icon for each of the plurality of devices within each security group, displays an icon for the newly connected device, and provides a drag and drop function allowing the user to specify whether the newly connected device is to join one of the first and second security groups.

11. The information apparatus according to claim 9, wherein the first plurality of devices include at least one of a camera, a deck, a material server, an editor, and a monitor.

12. An information processing method for an information processing apparatus configured to transfer first encrypted information from a sending source to a sending destination, comprising:
- storing a first common key used in said sending source and a second common key, different from said first common key, used in said sending destination, wherein said first and second common keys are assigned by a security manager configured to manage setting of keys for said sending source and said sending destination based on a device database and a key database;
- inputting said first encrypted information supplied from said sending source;
- decrypting said first encrypted information supplied from said sending source by use of said first common key;
- encrypting, at an encryptor, said information decrypted in said decryption step by use of said second common key;
- outputting said information encrypted in said encryption step as information to be transferred to said sending destination;
- transmitting said information decrypted in said decryption step to said encryptor through a predetermined route in said information processing apparatus; and
- executing control so as to execute said steps of decrypting, transmitting and encrypting, while transmitting said information through a route in said information processing apparatus,
- wherein the sending source is a first security group containing a first plurality of devices set to use the first common key,
- the security manager is arranged outside of the first security group and is further configured to determine whether a new device is connected to the security manager, acquire a device ID from the newly connected device, determine whether the newly connected device is registered in the device database based on the acquired device ID, register the newly connected device in the device database when it is determined that the newly connected device was not previously registered, determine whether the newly connected device is to join the security group, and when it is determined that the newly connected device is to join the security group, update the device database to associate the new device with the first common key, and
- said sending destination is configured as a second security group containing a second plurality of devices set to use the second common key, each of said security groups specifying that, when protection information is transmitted from a predetermined one of said first plurality of devices or said second plurality of devices to another one of said first plurality of devices or said second plurality of devices, respectively, said predetermined one device encrypts said protection information by use of said first or second common key to send resultant encrypted protection information and said another device receives said resultant encrypted protection information and decrypts said resultant encrypted protection information by use of said first or second common key, respectively.

13. A non-transitory computer readable medium storing a computer readable program that when executed by a computer causes the computer to control a transfer apparatus configured to send first encrypted information from a sending source to a sending destination, the computer program causing the computer to perform a method comprising:
- storing a first common key used in said sending source and a second common key, different from said first common key, used in said sending destination, wherein said first and second common keys are assigned by a security manager configured to manage setting of keys for said sending source and said sending destination based on a device database and a key database;
- inputting said first encrypted information supplied from said sending source;
- decrypting said first encrypted information supplied from said sending source by use of said first common key;
- encrypting, at an encryptor, said information decrypted in said decryption step by use of said second common key;
- outputting said information encrypted in said encryption step as information to be transferred to said sending destination;
- transmitting said information decrypted in said decryption step to said encryptor through a predetermined route in an information processing apparatus; and
- executing control so as to execute said steps of decrypting, transmitting and encrypting, while transmitting said information through a route in said information processing apparatus,
- wherein the sending source is a first security group containing a first plurality of devices set to use the first common key,
- the security manager is arranged outside of the first security group and is further configured to determine whether a new device is connected to the security manager, acquire a device ID from the newly connected device, determine whether the newly connected device is registered in the device database based on the acquired device ID, register the newly connected device in the device database when it is determined that the newly connected device was not previously registered, determine whether the newly connected device is to join the security group, and when it is determined that the newly connected device is to join the security group, update the device database to associate the new device with the first common key, and
- said sending destination is configured as a second security group containing a second plurality of devices set to use the second common key, each of said security groups specifying that, when protection information is transmitted from a predetermined one of said first plurality of devices or said second plurality of devices to another one of said first plurality of devices or said second plurality of devices, respectively, said predetermined one device encrypts said protection information by use of said first or second common key to send resultant encrypted protection information and said another device receives said resultant encrypted protection information and decrypts said resultant encrypted protection information by use of said first or second common key, respectively.

14. An information processing apparatus configured to transfer first encrypted information from a sending source to a sending destination, comprising:
- a memory storing a first common key used in said sending source and a second common key, different from said first common key, used in said sending destination, wherein said first and second common keys are assigned by a means for managing setting of keys for said sending source and said sending destination based on a device database and a key database;
- a receiver that receives said first encrypted information from said sending source;

a decryptor that decrypts said first encrypted information supplied from said sending source by use of said first common key to obtain decrypted information;

an encryptor that encrypts said decrypted information decrypted by said decryptor by use of said second common key and that outputs said encrypted information as information to be transferred to said sending destination; and a transmitter that transmits said decrypted information decrypted by said decryptor to said encryptor through a predetermined route in said information processing apparatus, wherein the sending source is a first security group containing a first plurality of devices set to use a common key, the means for managing is arranged outside of the first security group and is further a means for determining whether a new device is connected to the means for managing, acquiring a device ID from the newly connected device, determining whether the newly connected device is registered in the device database based on the acquired device ID, registering the newly connected device in the device database when it is determined that the newly connected device was not previously registered, determining whether the newly connected device is to join the security group, and when it is determined that the newly connected device is to join the security group, updating the device database to associate the new device with the first common key, and said sending destination is configured as a second security group containing a second plurality of devices set to use the second common key, each of said security groups specifying that, when protection information is transmitted from a predetermined one of said first plurality of devices or said second plurality of devices to another one of said first plurality of devices or said second plurality of devices, respectively, said predetermined one device encrypts said protection information by use of said first or second common key to send resultant encrypted protection information and said another device receives said resultant encrypted protection information and decrypts said resultant encrypted protection information by use of said first or second common key, respectively.

* * * * *